(12) United States Patent
Ryckman et al.

(10) Patent No.: US 11,320,584 B2
(45) Date of Patent: May 3, 2022

(54) DEEPLY SUB-WAVELENGTH ALL-DIELECTRIC WAVEGUIDE DESIGN AND METHOD FOR MAKING THE SAME

(71) Applicant: CLEMSON UNIVERSITY, Clemson, SC (US)

(72) Inventors: Judson D. Ryckman, Clemson, SC (US); Nazmus Sakib, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 16/870,185

(22) Filed: May 8, 2020

(65) Prior Publication Data

US 2020/0355868 A1 Nov. 12, 2020

Related U.S. Application Data

(60) Provisional application No. 62/844,815, filed on May 8, 2019.

(51) Int. Cl.
*G02B 6/10* (2006.01)
*G02B 6/12* (2006.01)
(Continued)

(52) U.S. Cl.
CPC ............ *G02B 6/107* (2013.01); *B82B 3/0061* (2013.01); *G02B 6/12014* (2013.01); *B82Y 10/00* (2013.01);
(Continued)

(58) Field of Classification Search
CPC .... G02B 6/107; G02B 6/12014; B82B 3/0061
See application file for complete search history.

(56) References Cited

U.S. PATENT DOCUMENTS 7,519,257 B2  4/2009  Lipson et al.
9,274,276 B2  3/2016  Jahani et al.
(Continued)

OTHER PUBLICATIONS

Almeida, et al. "Guiding and confining light in void nanostructure" *Opt. Lett.* 29 (2014) pp. 1209-1211.
(Continued)

*Primary Examiner* — Sung H Pak
(74) *Attorney, Agent, or Firm* — Dority & Manning, P.A.

(57) ABSTRACT

Accelerating photonic and opto-electronic technologies requires breaking current limits of modern chip-scale photonic devices. While electronics and computer technologies have benefited from "Moore's Law" scaling, photonic technologies are conventionally limited in scale by the wavelength of light. Recent sub-wavelength optical devices use nanostructures and plasmonic devices but still face fundamental performance limitations arising from metal-induced optical losses and resonance-induced narrow optical bandwidths. The present disclosure instead confines and guides light at deeply sub-wavelength dimensions while preserving low-loss and broadband operation. The wave nature of light is used while employing metal-free (all-dielectric) nanostructure geometries which effectively "pinch" light into ultra-small active volumes, for potentially about 100-1000× reduction in energy consumption of active photonic components such as phase-shifters. The present disclosure could make possible all-optical and quantum computing devices which require extreme optical confinement to achieve efficient light-matter interactions.

29 Claims, 12 Drawing Sheets

(51) Int. Cl.
*B82B 3/00* (2006.01)
*G01S 7/481* (2006.01)
*B82Y 10/00* (2011.01)
*B82Y 15/00* (2011.01)
*B82Y 20/00* (2011.01)
*G06E 1/00* (2006.01)
*G06N 10/00* (2022.01)

(52) U.S. Cl.
CPC .............. *B82Y 15/00* (2013.01); *B82Y 20/00* (2013.01); *G01S 7/481* (2013.01); *G02B 2006/12061* (2013.01); *G02B 2006/12107* (2013.01); *G06E 1/00* (2013.01); *G06N 10/00* (2019.01)

(56) References Cited

U.S. PATENT DOCUMENTS

| | | | |
|---|---|---|---|
| 9,494,715 | B2 | 11/2016 | Lee et al. |
| 9,709,734 | B2 | 7/2017 | Krishnamurthi et al. |
| 9,715,066 | B2 | 7/2017 | Ryckman |
| 10,365,507 | B2* | 7/2019 | Ishikura ............ G02F 1/0147 |
| 2015/0282728 | A1 | 10/2015 | Xi et al. |
| 2016/0299291 | A1 | 10/2016 | Smith et al. |
| 2021/0018599 | A1* | 1/2021 | Lu ..................... G01S 17/42 |

OTHER PUBLICATIONS

Assefa, et al. "CMOS—integrated high-speed MSM germanium waveguide photodetector" *Opt. Exp.* 18 (2010) pp. 4986-4999.
Beaudin, et al. "Precise localized thinning and vertical taper fabrication for silicon photonics using a modified local oxidation of silicon (LOCOS) fabrication process" *Opt. Exp.* 23 (2015) pp. 4377-4384.
Bhaskar, et al. "Quantum Nonlinear Optics with a Germanium-Vacancy Color Center in a Nanoscale Diamond Waveguide" *Phys. Rev. Lett.* 118:223603 (2017) pp.
Bian, et al. "Deep-subwavelength light transmission in hybrid nanowire-loaded silicon nano-rib waveguides" *Photo. Res.* 6 (2018) pp. 37-45.
Chang, et al. "Quantum nonlinear optics—Photon by photon" *Nat. Photo.* 8 (2014) pp. 685-694.
Choi, et al. "Self-Similar Nanocavity Design with Ultrasmall Mode Volume for Single-Photon Nonlinearities" *Phys. Rev. Lett.* 118 (2017) pp. 1-6.
De Cea, et al. "Power handling of silicon microring modulators" *Opt. Expr.* 27:24274 (2019) pp. 1-12.
Debnath, et al. "Low-Loss Silicon Waveguides and Grating Couplers Fabricated Using Anisotropic Wet Etching Technique" *Front. Mater.* 3 (2016) pp. 1-7.
Dong, et al. "Low loss shallow-ridge silicon waveguides" *Opt. Expr.* 18 (2010) pp. 14474-14479.
Dulkeith, et al. "Group index and group velocity dispersion in silicon-on-insulator photonic wires" *Opt. Expr.* 14 (2006) pp. 3853-3863.
Dulkeith, et al. "Self-phase-modulation in submicron silicon-on-insulator photonic wires" *Opt. Expr.* 14 (2006) pp. 5524-5534.
Eichenfield, et al. "Optomechanical crystals" *Nature* 462 (2009) pp. 78-82.
Feng, et al. "Lossless strip-to-slot waveguide transformer" *Opt. Lett.* 32 (2007) pp. 1250-1252.
Foster, et al. "Optimal waveguide dimensions for nonlinear interactions" *Opt. Expr.* 12 (2004) pp. 2880-2887.
Goban, et al. "Atom-light interactions in photonic crystals" *Nat. Comm.* 5 (2014) pp. 1-9.
Gramotnev, et al. "Plasmonics beyond the diffraction limit" *Nat. Photo.* 4 (2010) pp. 83-91.
Guo, et al. "Nanowire plasmonic waveguides, circuits and devices" *Laser Photo. Rev.* 7 (2013) pp. 855-881.

Guo, et al. "Full-vectorial propagation model and modified effective mode area of four-wave mixing in straight waveguides" *Opt. Lett.* 42 (2017) pp. 3670-3673.
Halir, et al. "Waveguide sub-wavelength structures: A review of principles and applications" *Laser Photo. Rev.* 9 (2015) pp. 25-49.
Harris, et al. "Efficient, Compact and Low Loss Thermo-Optic Phase Shifter in Silicon" *Opt. Expr.* 22 (2014) pp. 10487-10493.
Hu, et al. "Experimental realization of deep-subwavelength confinement in dielectric optical resonators" *Sci. Adv.* 4:eaat2355 (2018) pp. 1-6.
Hu, et al. "Design of Photonic Crystal Cavities for Extreme Light Concentration" *ACS Photo.* 3 (2016) pp. 1647-1653.
Hutchison, et al. "High-resolution aliasing-free optical beam steering" *Optica* 3 (2016) pp. 887-890.
Jahani, et al. "Transparent subdiffraction optics: nanoscale light confinement without metal" *Optica* 1 (2014) pp. 96-100.
Johnson, et al. "Molding the flow of light" *Comp. Sci. Eng.* 3 (2001) pp. 38-47.
Koos, et al. "Nonlinear silicon-on-insulator waveguides for all-optical signal processing" *Opt. Expr.* 15 (2007) pp. 5976-5990.
Kossey, et al. "End-fire silicon optical phased array with half-wavelength spacing" *APL Photo.* 3:011301 (2018) pp. 1-6.
Laegsgaard, et al. "Mode areas and field-energy distribution in honeycomb photonic bandgap fibers" *J. Opt. Soc. Am. B.* 20 (2003) pp. 2037-2045.
Leuthold, et al. "Nonlinear silicon photonics" *Nat. Photo.* 4 (2010) p. 535-544.
Ma, et al. "Applications of nanolasers" *Nat. Nanotech.* 14 (2019) pp. 12-22.
Maier, et al. "Plasmonics: Localization and guiding of electromagnetic energy in metal/dielectric structures" *J. Appl. Phys.* 98:011101 (2005) pp. 1-10.
Migita, et al. "Fabrication and Demonstration of 3-nm-Channel-Length Junctionless Field-Effect Transistors on Silicon-on-Insulator Substrates Using Anisotropic Wet Etching and Lateral Diffusion of Dopants" *Jpn. J. Appl. Phys.* 52:04CA01 (2013) pp. 1-5.
Miller, D.A.B. "Attojoule Optoelectronics for Low-Energy Information Processing and Communications" *J. Light. Tech.* 35 (2017) pp. 346-396.
Monat, et al. "Slow light enhancement of nonlinear effects in silicon engineered photonic crystal waveguides" *Opt. Expr.* 17 (2009) pp. 2944-2953.
Nogrette, et al. "Single-atom trapping in holographic 2D arrays of microtraps with arbitrary geometries" *Phys. Rev. X* 4:021034 (2014) pp. 1-9.
Oulton, et al. "A hybrid plasmonic waveguide for subwavelength confinement and long-range propagation" *Nat. Photo.* 2 (2008) pp. 496-500.
Reed, et al. "Silicon optical modulators" *Nat. Photo.* 4 (2010) pp. 518-526.
Robinson, et al. "First-principle derivation of gain in high-index-contrast waveguides" *Opt. Expr.* 16 (2008) pp. 16659-16669.
Robinson, et al. "On-chip gas detection in silicon optical microcavities" *Opt. Expr.* 16 (2008) pp. 4296-4301.
Rong, et al. "A continuous-wave Raman silicon laser" *Nature* 433 (2005) pp. 725-728.
Ryckman, et al. "Ultra-compact silicon photonic devices reconfigured by an optically induced semiconductor-to-metal transition" *Opt. Expr.* 21 (2013) pp. 10753-10763.
Ryckman, et al. "Three-dimensional patterning and morphological control of porous nanomaterials by gray-scale direct imprinting" *Sci. Rep.* 3 (2013).
Ryckman, J.D "Porous and Phase Change Nanomaterials for Photonic Applications" *Vanderbilt U.* (2013) pp. 1-216.
Ryckman, et al. "Low mode volume slotted photonic crystal single nanobeam cavity" *Appl. Phys. Lett.* 101:071104 (2012) pp. 1-4.
Ryckman, et al. "Photothermal optical modulation of ultracompact hybrid Si—$VO_2$ ring resonators" *Opt. Expr.* 20 (2012) pp. 13215-13225.
Ryckman, et al. "Localized field enhancements in guided and defect modes of a periodic slot waveguide" *IEEE Photo. J.* 3 (2011) pp. 986-995.

(56) References Cited

OTHER PUBLICATIONS

Sacher, et al. "Polarization rotator-splitters in standard active silicon photonics platforms" *Opt. Expr.* 22 (2014) pp. 3777-3786.
Sharstniou, et al. "Electrochemical nanoimprinting of silicon: A direct patterning approach" *Proc. SPIE* 10584 (2018) pp. 1-7.
Singh, et al. "Octave-spanning coherent supercontinuum generation in silicon on insulator from 1.06 μm to beyond 2.4 μm" *Light Sci. Appl.* 7:17131 (2018) pp. 1-8.
Strauf, et al. "High-frequency single-photon source with polarization control" *Nat. Photo.* 1 (2007) pp. 704-708.
Sun, et al. "Large-scale nanophotonic phased array" *Nature* 493 (2013) pp. 195-199.
Talukdar, et al. "Single-mode porous silicon waveguide interferometers with unity confinement factors for ultra-sensitive surface adlayer sensing" *Opt. Expr.* 27 (2019) pp. 22485-22498.
Timurdogan, et al. "An ultralow power athermal silicon modulator" *Nat. Commun.* 5 (2014) pp. 1-11.
Wang, et al. "Room-temperature InP distributed feedback laser array directly grown on silicon" *Nat. Photo.* 9 (2015) pp. 837-842.
Yang, et al. "Anapole-Assisted Strong Field Enhancement in Individual All-Dielectric Nanostructures" *ACS Photo.* 5 (2018) pp. 1960-1966.
Yang, et al. "Optical manipulation of nanoparticles and biomolecules in sub-wavelength slot waveguides" *Nature* 457 (2009) pp. 71-75.

\* cited by examiner

Fig. 4A
Fig. 4B
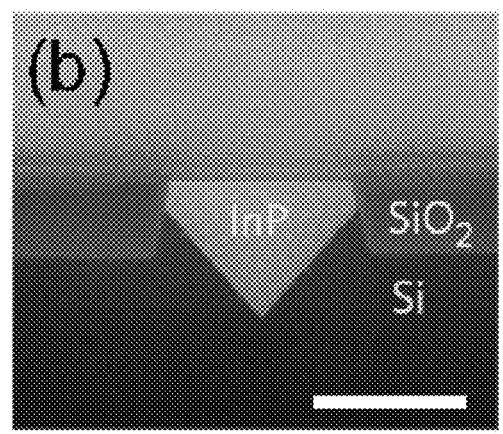
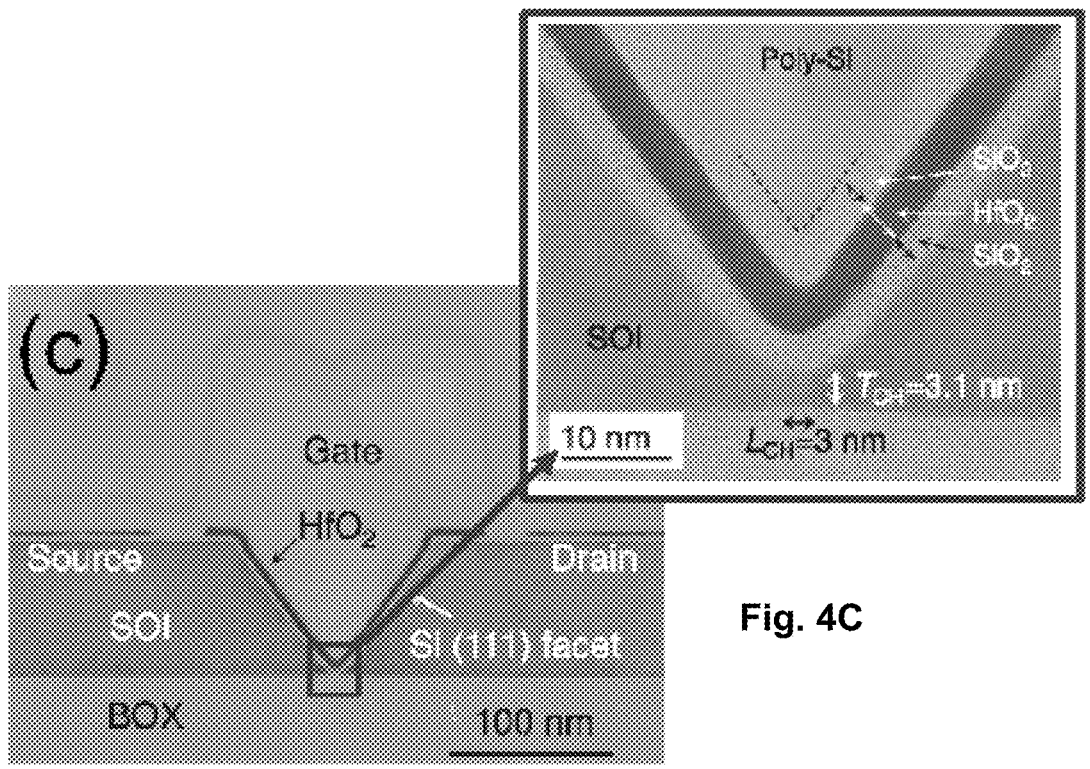
Fig. 4C

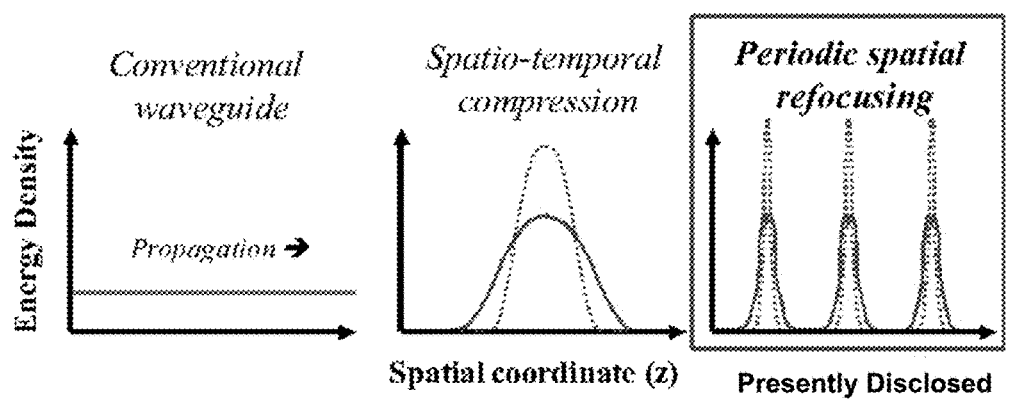
Fig. 5A
Prior Art
Fig. 5B
Prior Art
Fig. 5C
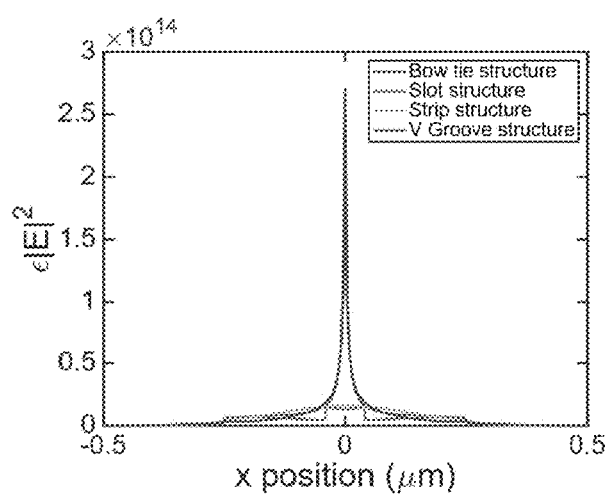
Fig. 5D
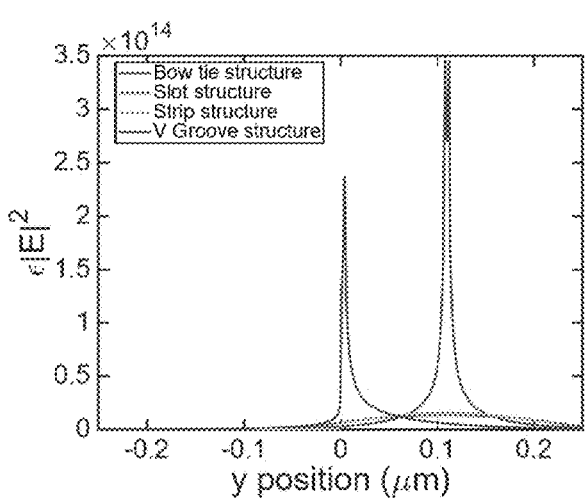
Fig. 5E Prior Art
"Diffraction Limited"

Presently Disclosed

Propagation in $+\hat{z}$

DEEPLY SUB-WAVELENGTH ALL-DIELECTRIC WAVEGUIDE DESIGN AND METHOD FOR MAKING THE SAME

PRIORITY CLAIM

The present application claims the benefit of priority of U.S. Provisional Patent Application No. 62/844,815, titled Deeply Sub-Wavelength All-Dielectric Waveguide Design and Method for Making the Same, filed May 8, 2019, which is incorporated herein by reference for all purposes.

GOVERNMENT SUPPORT CLAUSE

The presently disclosed subject matter was made with government support under FA9550-19-1-0057, issued by the United States Air Force. The government has certain rights in the invention.

FIELD

The present disclosure relates generally to subject matter concerning deeply sub-wavelength all-dielectric nanophotonics in silicon. More particularly, the present subject matter relates to deeply sub-wavelength all-dielectric waveguide design and associated and/or related methods for making the same.

Further, in certain embodiments thereof, the present disclosure relates to waveguide geometry that enables deep sub-wavelength field confinement to be achieved in all-dielectric structures, without the requirement for plasmonic nanostructures. The strong field confinement exhibited in these designs can be more than one to two orders of magnitude smaller than a conventional dielectric waveguide. This makes the field confinement comparable to that exhibited by nanoplasmonic structures. However, nanoplasmonic structures are severely limited in terms of propagation losses (dB/micron) owing to metallic absorption, thus rendering them impractical for many applications of photonics, while the presently disclosed all-dielectric structure can operate at much lower loss (dB/cm or lower) owing to negligible absorption. The present disclosure represents the first time extreme field confinement and low-loss propagation are supported in a single device. Lastly, the present disclosure encompasses a fabrication method for realizing such a waveguide design in a silicon waveguide based on preferential wet etching in the [100] direction (Miller indices).

BACKGROUND

While electronics and computer technologies have benefited from Moore's Law scaling—yielding modern compute capabilities alongside significant reductions in the size, weight, and power (SWaP) of microelectronic circuits—photonic technologies are conventionally limited in scale by the wavelength of light, thus making it difficult to realize a photonic analog to Moore's Law.

Technologies capable of nanoscale light confinement and manipulation are of paramount importance for existing and future applications of opto-electronics, non-linear optics, and quantum photonics. Nanostructures operating at sub-wavelength dimensions offer the prospect for realizing maximum energy efficiency and component density, which are critical parameters for maximizing device or system functionality while simultaneously optimizing the Size, Weight, and Power (SWaP) of optical and electro-optical systems required in emerging technologies. Despite enormous progress in the field of nanophotonics over the past two decades, the two leading architectures both face fundamental limitations: (1) nanoplasmonics achieve extreme light confinement but suffer high optical losses; and (2) all-dielectric resonators (e.g., photonic crystal, whispering gallery, Mie, etc.) achieve enhanced light-matter interactions but suffer narrow optical bandwidths. The development of an alternative architecture, capable of supporting nanoscale light confinement without the losses and bandwidth limitations of existing methods, that would be transformative and would yield new generations of photonic technologies broadly relevant to opto-electronics, non-linear optics, and quantum photonics.

As such, there is a need for the development of improved, high-performance non-plasmonic and non-resonant pathways for achieving extreme light confinement and enhanced light-matter interactions.

Modern active photonic components are limited in device size and power efficiency primarily by the strength of their light-matter interactions. Reductions in device power consumption are critical to advancing the performance of opto-electronic systems, such as transceivers used in data center communications, phased arrays used for laser ranging and 3D sensing, and emerging technologies such as active metamaterials. In some applications, it is desirable to maintain constant performance while operating with lower power, while in other applications, the desired performance levels are presently out of reach owing to the extreme power levels that are required. For example, it may be desirable to have arrays of hundreds to thousands of active photonic components on a single chip (i.e., for wavefront shaping, LIDAR, or active metamaterials); however, state-of-the art device efficiency presently makes such embodiments impractical owing to the extreme >W power consumption levels required and associated thermal implications.

Boosting light-matter interaction and improving power efficiency is a topic of intense interest in opto-electronics and requires increasing the optical field confinement and its overlap with the active material. In a conventional homogenous medium, optical field confinement is often considered to be "diffraction limited."

SUMMARY

Aspects and advantages of embodiments of the present disclosure will be set forth in part in the following description, or may be learned from the description, or may be learned through practice of the embodiments.

In general, it is a present objective to provide improved, high performance non-plasmonic and non-resonant pathways for achieving extreme light confinement and enhanced light-matter interactions.

The presently disclosed subject matter in some instances utilizes a design concept based on exploiting boundary conditions to Maxwell's equations in inhomogeneous media. It has been found per present disclosure that the 'diffraction limit' for homogenous media can be greatly surpassed in the presently disclosed nanostructured inhomogeneous designs, thus enabling record level field enhancement and localization to be achieved.

Moreover, a particular geometry has been identified—as presently disclosed (the "bridged V-Groove waveguide")—as being favorable from both a theoretical perspective and practical fabrication perspective.

Notably, the presently disclosed principle is applied to all-dielectric geometries, and thus, achieves extreme field confinement without the losses associated with plasmonics/metals.

Advantages over existing technology, in some instances, relate to improved power efficiency, enhanced light-matter interaction, and providing the potential for smaller size and/or stronger modulation.

Any company engaged in silicon photonics may potentially be interested in this technology. Design efforts predict components such as waveguide phase shifters can be improved by >10-100X in terms of energy efficiency while maintaining the same performance. This is particularly relevant to phase shifters required in LIDAR applications and transceiver applications. Alternative future applications may extend to emerging areas of non-linear optics and quantum optics/computing.

In currently considered embodiments, the presently disclosed subject matter, in some instances, may be used as an active optoelectronic device in photonic circuits and systems.

Further, some embodiments in accordance with the presently disclosed subject matter may, in some instances, achieve a ~100-1000× reduction in the energy consumption of active photonic components such as phase-shifters critical to data communications and laser-based 3D sensors. Accordingly, the presently disclosed subject matter may also pave a path for new generations of all-optical and quantum computing devices which require extreme optical confinement to achieve efficient light-matter interactions.

It is a more particular objective, in some instances, to provide an improved design and methodology approach which allows users of the presently disclosed subject matter to map out and understand the limits of light confinement in inhomogeneous all-dielectric media, with a particular focus on realizable geometries in silicon.

In particular, for some presently disclosed exemplary embodiments, it is desirable to realize such a scalable and CMOS compatible platform, and to characterize its key performance metrics and fundamental/addressable limitations.

It is also desirable in the field of linear and non-linear optics to provide disclosure of particular relevance to DoD missions and technologies. Still further, in some instances, users may, in effect, establish new design rules for all-dielectric components exhibiting nanoscale light confinement and foster new avenues of research pertaining to deeply sub-wavelength all-dielectric nanophotonics and its applications.

Further objects relate to investigation of deeply sub-wavelength all-dielectric nanophotonics to better achieve extreme light confinement without plasmonics or resonance, to yield straightforward and elegant design rules which can be applied in many types of optical structures, and to provide a pathway towards realizing a "Moore's Law" level of progress for photonics.

Other objects relative to providing detailed device modelling in 2D and 3D, with a focus on scalable silicon photonic nanostructures, is to provide improved, detailed understanding of the limits of light confinement in inhomogeneous all-dielectric systems.

Technologies capable of nanoscale light confinement and manipulation are of paramount importance for existing and future applications of opto-electronics, non-linear optics, and quantum photonics. Nanostructures operating at sub-wavelength dimensions offer the prospect for realizing maximum energy efficiency and component density, which are critical parameters for maximizing device or system functionality while simultaneously optimizing the Size, Weight, and Power (SWaP) of optical and electro-optical systems required in emerging technologies. Despite enormous progress in the field of nanophotonics over the past two decades, the two leading architectures both face fundamental limitations: (1) nanoplasmonics achieve extreme light confinement, but suffer high optical losses; and (2) all-dielectric resonators (e.g., photonic crystal, whispering gallery, Mie, etc.) achieve enhanced light-matter interactions, but suffer narrow optical bandwidths. The development of an alternative architecture, capable of supporting nanoscale light confinement without the losses and bandwidth limitations of existing methods, that would be transformative and would yield new generations of photonic technologies broadly relevant to opto-electronics, non-linear optics, and quantum photonics is needed.

In order to continue addressing the technology demands of the 21st century, it is critical to investigate novel photonic approaches which can, at a fundamental level, drive new or improved functionalities and significant reductions in SWaP. The presently disclosed subject matter is targeted at the heart of this high-level problem—how to unleash new function while also minimizing SWaP.

As an illustrative example of this high-level problem, let us briefly consider a photonic phased array. The dense integration of many active and passive photonic components on-chip now makes possible novel functionality in the far-field, a domain of particular technological importance for sensing, remote communications, and emerging applications in atom and nanoparticle trapping and neuro-photonic manipulation[1]-[4]. Increasing the functionality/performance of this platform requires, to a large extent, maximizing the on-chip component density and efficiency of each component. However, whereas an array of ~100×100 components (~10 k) may be desired for maximum functionality, the phase and energy efficiency of on-chip phase shifters currently limits the feasible on-chip density to arrays on the order of ~10×10 (~100 s) while keeping within practical power budgets. A solution to this problem would require the development of an ultra-efficient and low-loss phase shifter, ideally featuring nanoscale optical confinement. Plasmonic solutions offer the nanoscale optical confinement aspect but fail to support low-loss transmission. Also, although innovative materials-based solutions with attractive or novel switching dynamics may soon be uncovered, CMOS incompatibilities prevent true scalability, and the fundamental photonic bottleneck remains. This technological problem will be addressed by developing an all-dielectric and CMOS compatible approach for achieving nanoscale light confinement with an expected ~100-1000× enhanced phase shifter energy efficiency (effectively, a 100-1000× increase in feasible component density under a fixed power budget).

One exemplary embodiment of presently disclosed subject matter relates to a deeply sub-wavelength all-dielectric waveguide. Such exemplary waveguide preferably comprises a body of a plurality of metal-free (all-dielectric) nanostructure geometries which respectively confines light into ultra-small active volumes for providing non-plasmonic and non-resonant pathways for achieving relatively high light confinement and enhanced light-matter interactions.

Further, some such exemplary waveguide embodiments may comprise a V-Groove waveguide design. For some such embodiments, such waveguide may comprise a bridged-V-Groove waveguide design, comprising a strip waveguide with a V-Groove etched into the middle thereof, terminating before reaching the bottom of the strip waveguide, resulting in a nanoscale height silicon bridge. In other exemplary embodiments, such exemplary waveguide designs may comprise other shaped designs, such as a bow tie waveguide or a bridged bow tie waveguide.

In other exemplary embodiments, such nanostructure geometries may comprise scalable silicon photonic nanostructures for improved light confinement in inhomogeneous all-dielectric systems.

For yet other exemplary embodiments, such waveguide may comprise an active optoelectronic device in one of a photonic circuit and system for providing nonlinear optics and all-optical signal processing in silicon.

It will be understood by those of ordinary skill in the art from the complete disclosure herewith that the presently disclosed subject matter equally relates to both apparatus and corresponding and associated methods. One presently disclosed exemplary method embodiments relates in pertinent part to a method for fabricating waveguide geometry that enables deep sub-wavelength field confinement to be achieved in all-dielectric structures without the requirement for plasmonic nanostructures. Such exemplary method may preferably comprise realizing a waveguide design in an all-dielectric silicon waveguide based on preferential wet etching in the [100] direction, wherein such waveguide design results in a predetermined shaped waveguide. For example, a bow tie or V-Groove waveguide design may result, and in some instances, either of a bridged-bow tie, bridged-V-Groove, or other predetermined shaped design. Preferably, per such method, field confinement of the resulting waveguide is at least an order of magnitude smaller than that of a conventional dielectric waveguide. For example, field confinement may be defined or measured in a classical way, such as defined via the definition of mode area ($A_{eff}$).

Per yet another exemplary embodiment, in some instances, such waveguide design may comprise a bridged-V-Groove waveguide design, comprising a strip waveguide with a V-Groove etched into the middle thereof, terminating before reaching the bottom of the strip waveguide, resulting in a nanoscale height silicon bridge.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the FIGS. or stated in the detailed description of such FIGS.). Additional embodiments of the presently disclosed subject matter, not necessarily expressed in the summarized section, may include and incorporate various combinations of aspects of features, components, or steps referenced in the summarized objects above and/or other features, components, or steps as otherwise discussed in this application. Those of ordinary skill in the art will better appreciate the features and aspects of such embodiments, and others, upon review of the remainder of the specification, will appreciate that the presently disclosed subject matter applies equally to corresponding methodologies as associated with practice of any of the present exemplary devices and vice versa.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended Figures, in which:

FIG. 4A schematically represents anisotropic wet etching of (100) Si as a scalable approach for realizing nanoscale optical confinement;

FIG. 4B schematically represents literature examples of wet etched Si V-Grooves used for growth of InP on (111) Si facets[18];

FIG. 4C schematically represents literature examples of wet etched Si V-Grooves used for fabrication of junctionless MOSFETs with ultra-short ~3 nm channel lengths[19];

FIG. 5A is a conceptual illustration of optical energy density profiles achieved in conventional waveguides (e.g., nanowire or slot);

FIG. 5B is a conceptual illustration of optical energy density profiles achieved in spatiotemporal compression schemes (e.g., slow-light devices or resonators);

FIG. 5C is a conceptual illustration of optical energy density profiles achieved in the presently disclosed technique of periodic spatial refocusing (PSR);

FIGS. 5D and 5E, respectively, illustrate x position and y position features of two preferred designs (V-Groove and bow tie) relative to current art (slot and strip), using a 1D cross section;

Figure 1A:
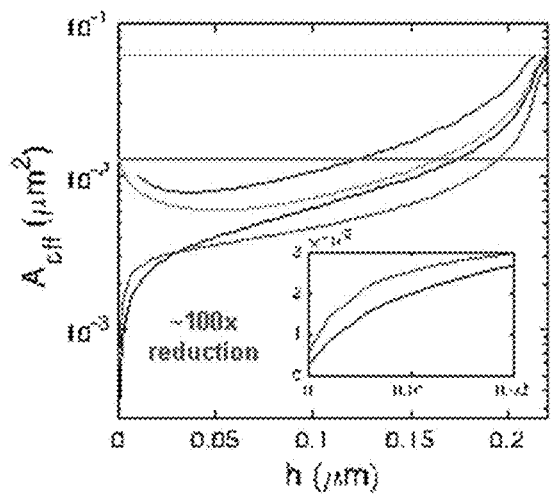
FIGS. 1A through 1D graphically illustrate respective Modeling results in accordance with presently disclosed subject matter.
Figure 1B:
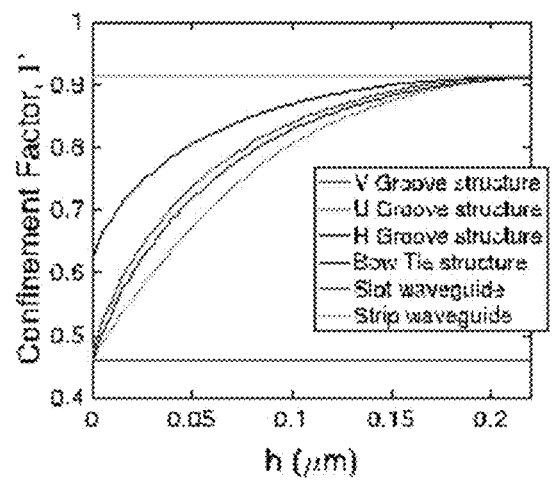
Figure 1C:
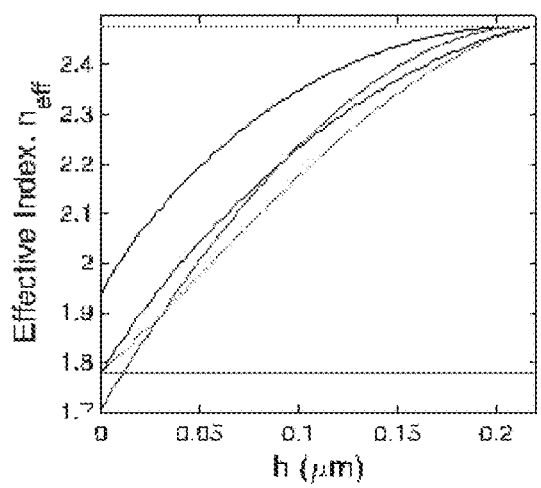
Figure 1D:
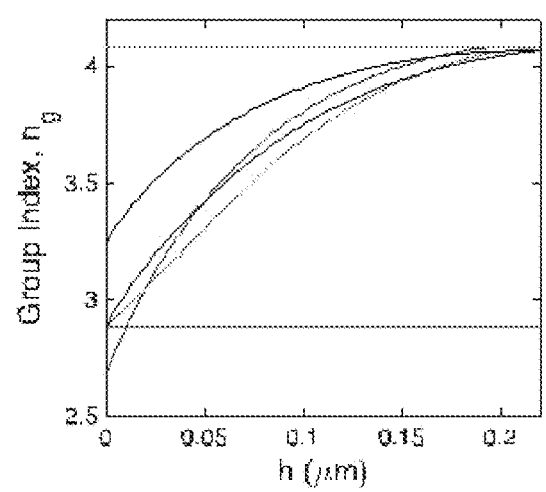

Repeat use of reference characters in the present specification and drawings is intended to represent the same or analogous features or elements or steps of the presently disclosed subject matter.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In some respects, the miniaturization and efficiency scaling of existing active optical components has plateaued in recent years owing to diffraction limited operation and the unacceptable high losses of plasmonic alternatives. An all-dielectric (low loss) and CMOS compatible platform which overcomes the limitations of plasmonic platforms is desired. Per presently disclosed subject matter, this requires scaling the mode area to deeply sub-wavelength dimensions while preserving confinement factor.

For example, in some instances, the presently disclosed subject matter can exploit orthogonal boundary conditions of Maxwell's equations to constrain the mode solution and enhance the electric field energy density.

$$D_{\perp,1} = D_{\perp,2} \rightarrow E_{\perp,1} = \left|\frac{\varepsilon_2}{\varepsilon_1}\right| E_{\perp,2}$$

$$E_{\parallel,1} = E_{\parallel,2} \rightarrow D_{\parallel,2} = \left|\frac{\varepsilon_2}{\varepsilon_1}\right| D_{\parallel,1}$$

Electric field energy density enhancement:

$$\propto \left|\frac{\varepsilon_2}{\varepsilon_1}\right|^2$$

The mode area and confinement factor are defined as:

$$A_{eff} = \frac{\iint |D \cdot E| dx dy}{\max(|D \cdot E|)} = \frac{\iint \varepsilon |E|^2 dx dy}{\max(\varepsilon |E|^2)}$$

$$\Gamma = \frac{\iint \varepsilon |E(\varepsilon = \varepsilon_2)|^2 dx dy}{\iint \varepsilon |E|^2 dx dy}$$

ε=dielectric constant, E=electric field, D=electric displacement

Modeling results are represented by FIGS. 1A through 1D, respectively.

Presently disclosed subject matter also examines the effective nonlinear mode area for light-matter interactions in either the high-index core region or low index cladding region of the silicon waveguide. A results overview is shown by Table 1 below.

TABLE 1

| Waveguide Type | Modal area, $A_{eff}$ (μm²) | Confinement factor, Γ | Group index, $n_g$ | Effective index, $n_{eff}$ |
|---|---|---|---|---|
| Strip | 0.063 | 0.91 | 4.08 | 2.48 |
| Slot | 0.013 | 0.46 | 2.88 | 1.78 |
| H-Groove | 0.008 | 0.6 | 3.14 | 1.9 |
| U-Groove | 0.007 | 0.56 | 3.05 | 1.86 |
| V-Groove | 0.003 | 0.62 | 3.04 | 1.84 |
| Bow tie | 0.0027 | 0.73 | 3.47 | 2.06 |

(h = 20 nm)

Some significant determinations from such considerations include that bow tie structures followed by V-Groove structures achieve the lowest modal areas, $A_{eff}$. Also, it is predicted that there can be a nearly 100× reduction in $A_{eff}$ relative to strip waveguides and ~10× reduction in $A_{eff}$ relative to a slot waveguides. Such values are comparable to nanoplasmonic devices (which suffer high loss).

Counterintuitively, the effective nonlinear interaction with the core region is suppressed as the peak energy density increases ($A_{eff}$, NL ↑).

Figure 1E:
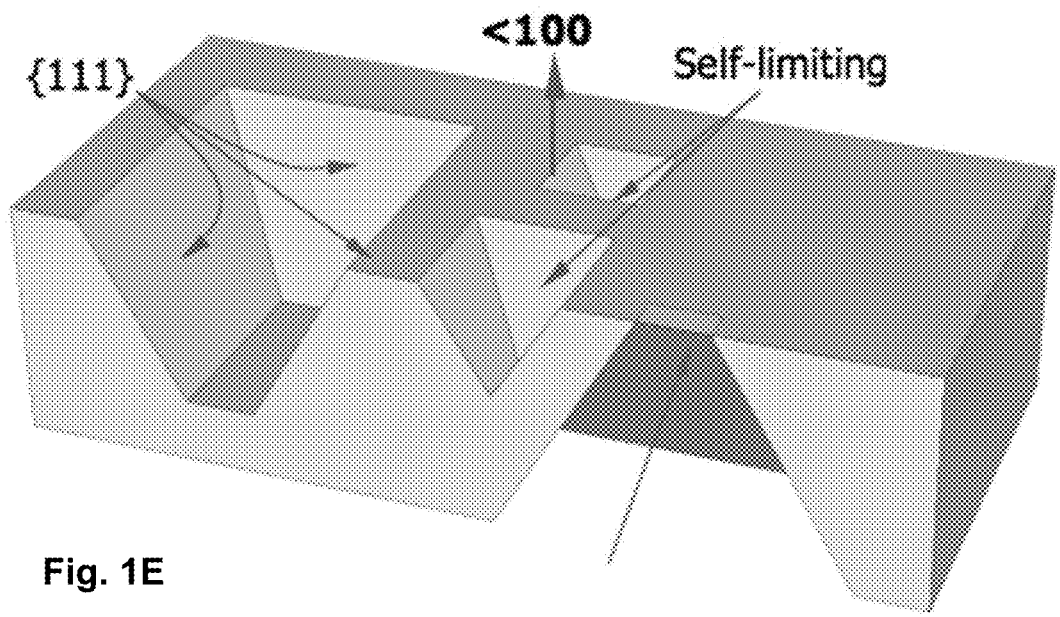
FIGS. 1E and 1F illustrate respective representative top views of V-Groove waveguide structures after KOH wet etching is done.
Figure 1F:
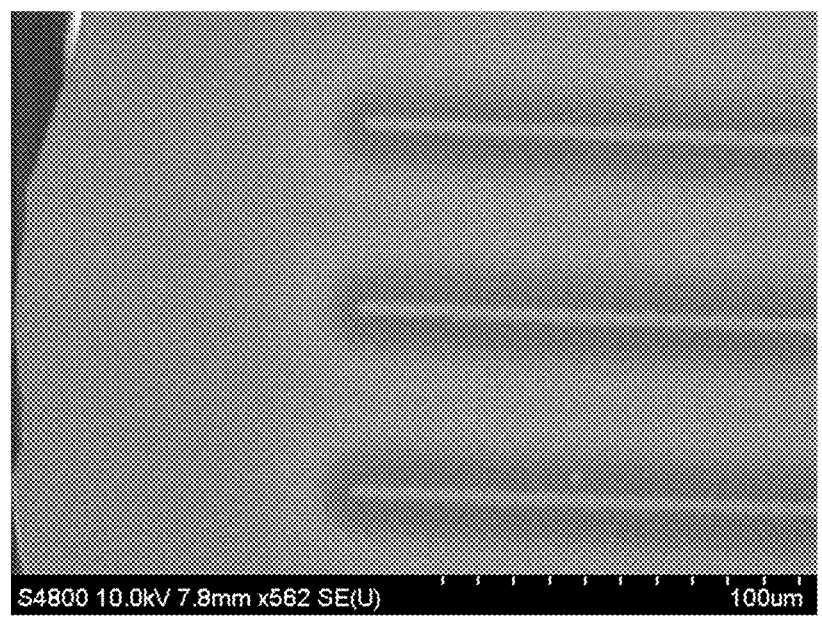

An etch rate of <100> silicon crystal orientation using KOH wet etchant is higher than etch rate of <111> silicon crystal orientation. As a result, a V-Groove structure may be formed with 54.7° angle with the surface. FIGS. 1E and 1F illustrate representative top views of the V-Groove structures after KOH wet etching is done.

Mode area calculations reveal that the Bow tie and V-Groove structures achieve the lowest mode areas of any all-dielectric waveguide geometry reported to date. Despite the lower mode areas, the confinement factors of bow tie and V-Groove structures are higher than that of slot waveguides.

However, the V-Groove waveguide geometry is amenable to CMOS compatible fabrication through self-limiting KOH wet etching. KOH wet etching forms a 54.7° angle with the surface of silicon crystal due to its higher etching rate along <100> crystal orientation compared to <111> crystal orientation.

More generally regarding the presently disclosed subject matter, a core problem to be considered is the scaling of optical energy density, the solution for which could help movement towards a "Moore's Law" for photonics.

Figure 2A:
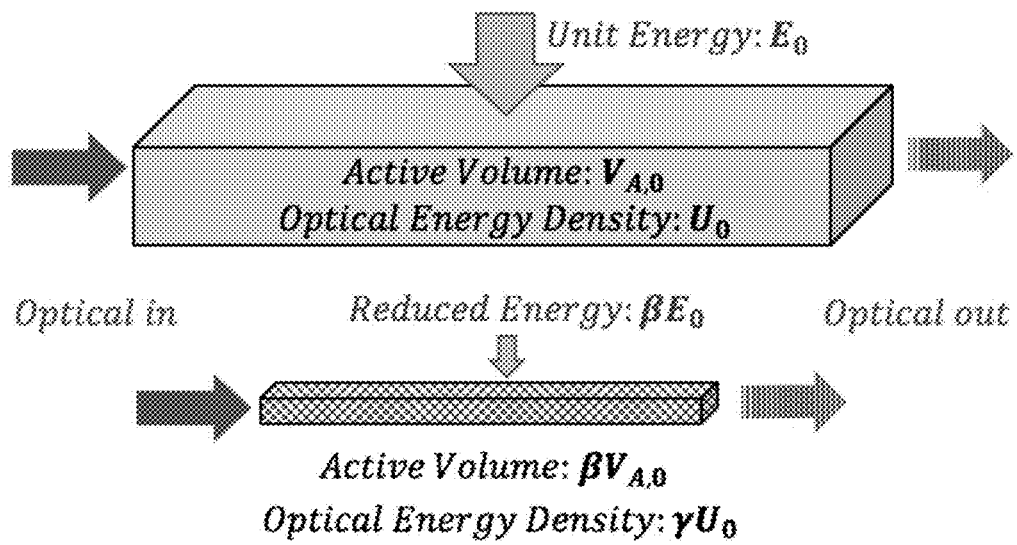
FIG. 2A represents an exemplary illustration of scaling energy consumption, active volume, and optical energy density.

Although these two illustrative problems encompass very distinct and specific applications of linear and nonlinear photonics, they share a common underlying bottleneck—the problem of focusing and enhancing the local optical energy density. In principle, all active photonic components designed to enhance light-matter interactions are limited by this bottleneck, which is illustrated for linear devices in application FIG. 2A. In particular, FIG. 2A represents an exemplary illustration of scaling energy consumption, active volume, and optical energy density. Scaling the active volume by a factor $\beta$ translates directly into scaling the energy consumption by the same factor, as less material can be "energized" or perturbed from equilibrium via solid-state methods such as charge injection, depletion, or accumulation. However, it is possible to achieve equivalent device performance only if the optical energy density is correspondingly increased by a factor $\gamma=1/\beta$[8]. This scaling concept is a cornerstone of modern nanophotonics and is among the primary motivations for transitioning free-space optics into fiber-optics and fiber-optics into integrated (silicon) photonics (enabling significant benefits to SWaP). Continued scaling of optical energy density can provide a possible route for realizing a "Moore's Law" for photonics—which is currently hindered by the fundamental barriers noted in the examples above (i.e., tradeoffs between energy density and loss and between energy density and bandwidth), thus restricting the efficiency and density of components that can practically be integrated on-chip.

Figure 2B:
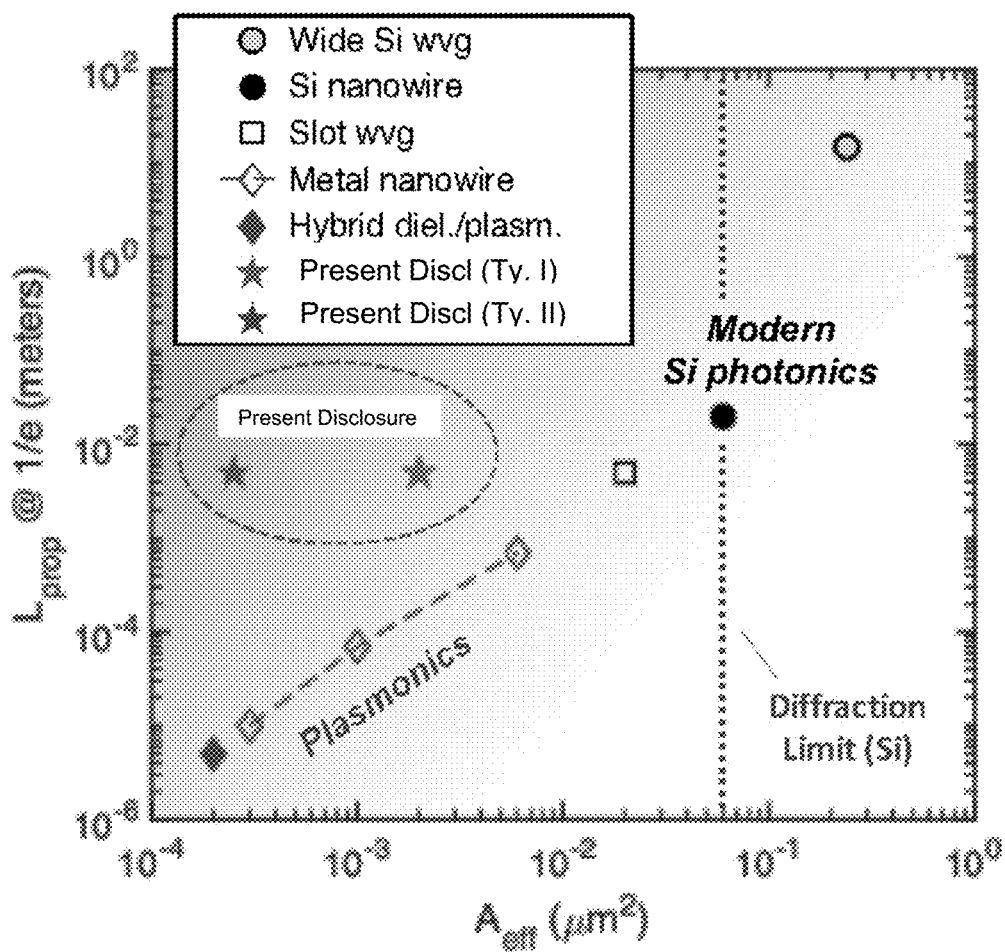
FIG. 2B illustrates a chart of effective mode area vs. propagation length (@ 1/e) for on-chip waveguide platforms including: Wide Si waveguides[9], Si nanowires[10], Slot waveguides[11], plasmonic metal and hybrid dielectric/plasmonic nanowires[12]-[13], and per presently disclosed subject matter.

Application FIG. 2B examines the effective mode area, $A_{eff}$, and propagation length, $L_{prop}$ (@ 1/e intensity), for various on-chip waveguide platforms spanning several decades of mode-dimensions and propagation losses[9]-[13].

In particular, FIG. 2B illustrates a chart of effective mode area vs. propagation length (@ 1/e) for on-chip waveguide platforms including: Wide Si waveguides[9], Si nanowires[10], Slot waveguides[11], plasmonic metal, and hybrid dielectric/plasmonic nanowires[12]-[13], and per presently disclosed subject matter. In Table 2 below, this comparison is expanded to include confinement factor F (within the high-index active medium), and nominal propagation loss for state-of-the-art guided wave platforms. The effective mode area is a critical parameter for both linear and nonlinear devices as it directly determines the local energy density, and therefore, determines the energy density scaling factor, $\gamma$, from FIG. 2A. As illustrated in FIG. 2B and Table 2, achieving nano-scale optical confinement and a small $A_{eff}$ is typically associated with increased losses and reduced confinement factor. The confinement factor, $\Gamma$, is an expression (Eq. 1) of the percentage of the mode's electric field power that is confined within the active medium. If the active volume of a device is reduced by more than the optical energy density ($\beta<1/\gamma$), then $\Gamma$ will necessarily degrade and equivalent performance per unit energy is not possible. However, if the optical energy density is scaled more rapidly than the active volume, then it is possible to achieve equivalent performance even with a lower $\Gamma$. To capture this trade-off, first one calculates a Figure-of-merit: $FOM_1=\Gamma/A_{eff}$. Depending on the particular application, a second FOM may be derived by multiplying either $A_{eff}$ or $FOM_1$ by the effective propagation length, $L_{prop}$ (inversely related to propagation loss). For clarity, propagation loss and length are presented as independent parameters.

TABLE 2

| | Reference | $A_{eff}(\mu m^2)$ | !**(%) | $FOM_1$: $(!/A_{eff})^*$ | $A_0$ | Loss (dB/cm) | $L_{prop}$ (@ 1/e) |
|---|---|---|---|---|---|---|---|
| Free Space (air) | — | 0.6 | — | — | | — | — |
| SM Fiber | — | 0.29 | 80 | ~20 | | ~10% & | ~8 km |
| Wide Si wvg. | [9] | 0.24 | 95 | ~24 | | ~0.2-0.3 | ~15 cm |
| Si nanowire wvg. | [10] | 0.06* | 90 | ~90 | | ~2-3 | ~2 km |
| Si slot wvg. | [11] | ~10%' | ~40 | ~120 | | ~6-20 | ~0.5 cm |
| Nanoplasmonic | [12, 13] | ~$10^{-4}$-$10^{-2}$ | ~0.5-5 | ~300 | | ~$10^($ | ~5-75 μm |
| Hybrid Dielectric/plasmonic | [12, 13] | ~$10^{-4}$-$10^{-3}$ | ~20 | ~6000 | | ~$10^($ | ~5-25 μm |
| Present disclosure (Type I) | — | ~10%+ | ~50 | ~1500 | | TBD, Est. 6-10 | Est. ~0.5 cm |
| Present disclosure (Type II) | — | ~10%( | ~20 | ~6000 | | TBD, Est. 6-10 | Est. ~0.5 cm |

In particular, Table 2 represents the comparison of mode confinement and loss parameters for various optical platforms including the deeply sub-wavelength all-dielectric Si-based platform considered in this research. **=confinement factor in an active high-index medium (not cladding); *=reference mode area, $A_0$.

The effective mode area for both SM fiber and the Si nanowire waveguide is well approximated by the diffraction limit. Fiber surpasses the diffraction limited spot size in air owing to the higher refractive index of glass, and the Si nanowire waveguides similarly surpasses the diffraction limit of glass fiber owing to the higher refractive index of Silicon. Importantly however, energy density scaling does not stop at this diffraction limit—as demonstrated by "sub-diffractive" slot and plasmonic waveguides. These seemingly peculiar results are achievable because the "diffraction limit" is valid only for homogenous media; indeed, there is as yet no universal diffraction limit for inhomogeneous media (characterized by non-trivial solutions to Maxwell's equations that are, crucially, constrained by boundary conditions). From this critical and largely overlooked point, one may thus form an overarching hypothesis which motivates this work. Namely, the present disclosure proposes that all existing "sub-diffraction" devices (i.e., plasmonic and slot waveguides) exploit only a small subset of a larger, yet not fully mapped, design space which exploits all boundary conditions of Maxwell's equations in all three-dimensions to achieve energy density scaling. It is further presently posited that the effective diffraction limit for inhomogeneous media is realized only when these boundary conditions are optimally exploited. The presently disclosed subject matter will provide important insight in this area and uncover new approaches which expands the "toolbox" of available sub-wavelength photonic devices and design principles.

In our recent work, the feasibility of applying this concept to nanostructured silicon waveguides is demonstrated. Here, such designs are categorized into two general types (Type I and Type II). Within each design Type, a variety of nanostructure geometries can be utilized based on our approach. In Type I, transverse boundary conditions in the 2D cross-section of a waveguide are exploited. The presently disclosed design uniquely constrains the eigenmode solution, owing the emphasis on orthogonal boundary conditions, and demonstrates an $A_{\it eff}$, which is, for the first time in an all-dielectric device, comparable to the $A_{\it eff}$ of a nanoplasmonic or hybrid dielectric/plasmonic device (Table 2). This present disclosure further proposes a highly scalable and CMOS compatible method for realizing these deeply sub-wavelength Si waveguides with potentially high-yield and low-fabrication variance. With this process, one can predict that a low propagation loss will also be achievable, conservatively forecasted within the range from ~6-10 dB/cm (approximately 3 orders of magnitude lower loss than a nanoplasmonic device with a comparable $A_{\it eff}$). It is presently predicted that reductions in this loss to less than 2 dB/cm will ultimately be achievable, as the wet etch process is capable of producing sidewalls with near negligible roughness and minimal scattering loss[14].

In Type II designs, boundary conditions to Maxwell's equations in 3D will be exploited to further enhance the sub-wavelength character of the presently disclosed guided wave platform. The presently disclosed approach will rely on periodically applying orthogonal boundary conditions in a waveguide operating as a sub-wavelength grating. This approach will allow us to achieve extreme energy density scaling in the longitudinal direction without relying on high wave-vector propagation constants or slow-light designs. Early calculations suggest this approach will sacrifice some confinement factor but will gain significantly in energy density—thus resulting in the highest FOM of any known waveguide design (Table 2). This design effectively surpasses the $A_{\it eff}$ of nanoplasmonic platforms, while again supporting theoretically lossless propagation.

Figure 3A:
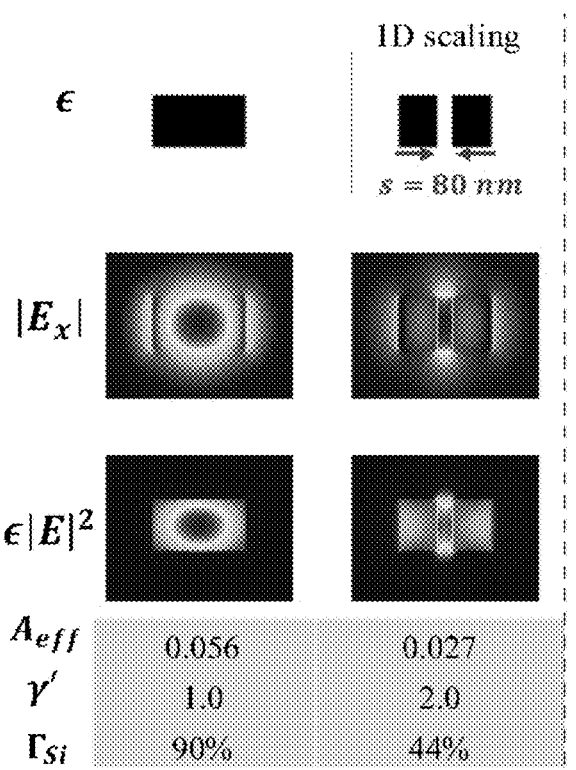
FIG. 3A illustrates aspects of exemplary conventional Si nanowire and slot waveguides.
Figure 3B:
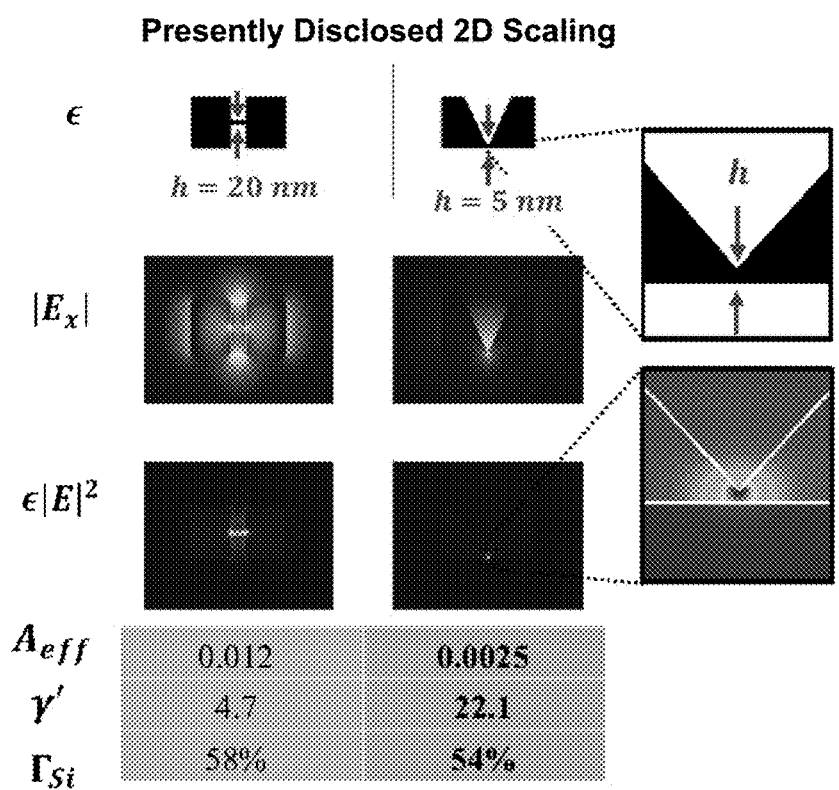
FIG. 3B illustrates aspects of presently disclosed 2D scaling approach featuring deep sub-wavelength optical confinement and preservation of high confinement factor.

Type I designs—Deeply sub-wavelength all-dielectric silicon waveguides: Transverse Scaling:

FIGS. 3A and 3B, respectively, present and compare the dielectric profile, electric field, and energy density distributions for the presently disclosed prototype nanophotonic waveguide designs against reference SOI strip and slot waveguides. In particular, FIG. 3A illustrates aspects of exemplary conventional Si nanowire and slot waveguides, while FIG. 3B illustrates aspects of presently disclosed 2D scaling approach featuring deep sub-wavelength optical confinement and preservation of high confinement factor. They further compute the effective mode area, $A_{\it eff}$, the optical energy density scaling factor for the transverse dimension, $\gamma'$, referenced to the single mode strip waveguide, and the transverse confinement factor within silicon, $\Gamma_{Si}'=\Gamma_0$, from the master confinement factor equation[15]:

$$\Gamma = \frac{n_A}{z_0} \frac{\iint_A |E|^2 dxdy}{\iint_\infty \text{Re}\{E \times H^*\} \cdot \hat{z} dxdy} = \frac{n_g}{n_A} \frac{\iint_A \varepsilon_A |E|^2 dxdy}{\iint_\infty \varepsilon |E|^2 dxdy} = \frac{n_g}{n_A} \Gamma_0. \quad (1)$$

Note: This equation reinforces the concept that for linear devices operating inhomogeneous media, the concentration of electric field energy density, $\varepsilon|E|^2$, is the critical factor, not the simple concentration of field intensity, $|E|^2$ (which the $\varepsilon|E|^2$ integrals reduce to for a homogenous medium). This important point must be taken into consideration in inhomogeneous media and especially so for high-index contrast systems[15]. Conceptually, this is well-aligned with the critical nature of optical energy density as discussed with regard to FIG. 2A.

The slot waveguide exploits one specific boundary condition of Maxwell's equations in 1D—continuity of normal electric displacement[16]:

$$D_{\perp,1} = D_{\perp,2} \rightarrow E_{\perp,1} = \left|\frac{\epsilon_2}{\epsilon_1}\right| E_{\perp,2}. \quad (2)$$

This boundary condition permits the enhancement of both the electric field intensity and the optical energy density in the low index medium, and is commonly used in both slot-waveguides and nanoplasmonic devices. As shown in FIG. 2B, this approach enables the slot waveguide to achieve a reduction in $A_{\it eff}$ relative to the Si nanowire waveguide. However, this approach is also restricted to confining light primarily in the low-index medium. While this has proved attractive for enhancing evanescent light-matter interactions (e.g., with cladding, polymers, etc.), it is not particularly useful for solid-state devices or for enhancing the light-matter interaction with Silicon.

In the presently disclosed designs, one can pursue higher dimensional energy density scaling by simultaneously harnessing a second and orthogonal boundary condition—continuity of tangential electric field:

$$E_{\parallel,1} = E_{\parallel,2} \rightarrow D_{\parallel,2} = \left|\frac{\epsilon_2}{\epsilon_1}\right| D_{\parallel,1}. \quad (3)$$

Importantly, this second boundary condition reveals that tangential electric displacement is enhanced within the high-index medium. If a high-index 'bridge' is introduced to span the 'slot', as in FIG. 3B (left-hand column), the already 'slot enhanced' optical energy density $\varepsilon|E|^2$ will be further enhanced within the high-index bridge by a total factor as high as $|\epsilon_2/\epsilon_1|^2 = |n_2/n_1|^4$ (in the selected 2D transverse plane). This approach effectively 'squares' the enhancement provided by the 'slot effect' and forces the peak optical energy density to reside in a high-index medium[17]. Calculations on this "H-waveguide" structure (FIG. 3B) demonstrate that the $A_{\it eff}$ is indeed reduced approximately as square of the original slot scaling factor.

With these orthogonal boundary conditions and a new energy density scaling framework in place, one can seek to simultaneously (1) optimize this scaling and (2) map this scaling into a practical nanostructure for scalable nanofabrication. The present disclosure proposes to address both points with a simple solution—a "bridged-V-Groove" waveguide design, which is depicted in the right-hand column of FIG. 3B. This structure is effectively a conventional strip waveguide with a V-Groove etched into the middle that should terminate before reaching the bottom of the strip waveguide. The result leaves a nanoscale height, h, silicon "bridge" which is necessary to realize presently achieved extremely small $A_{eff}$ while preserving peak power within a high-index material. Note: Without the "bridge," the V-Groove waveguide would break down due to the lack of a second boundary condition to enforce (Eq. 3). Also, the V-Groove shape importantly redistributes the field to maximize the 'slot type' enhancement (Eq. 2) only at the spatial location where the 'bridge-type' enhancement (Eq. 3) is enforced, thus achieving a smaller $A_{eff}$ than is possible in any "H-waveguide" geometry. Notably, the presently disclosed prototype bridged V-Groove waveguide achieves an ultralow $A_{eff}$, which represents a scaling of >20× below the diffraction limit for bulk silicon, and remarkably retains a majority of power within silicon.

Figure 3C:
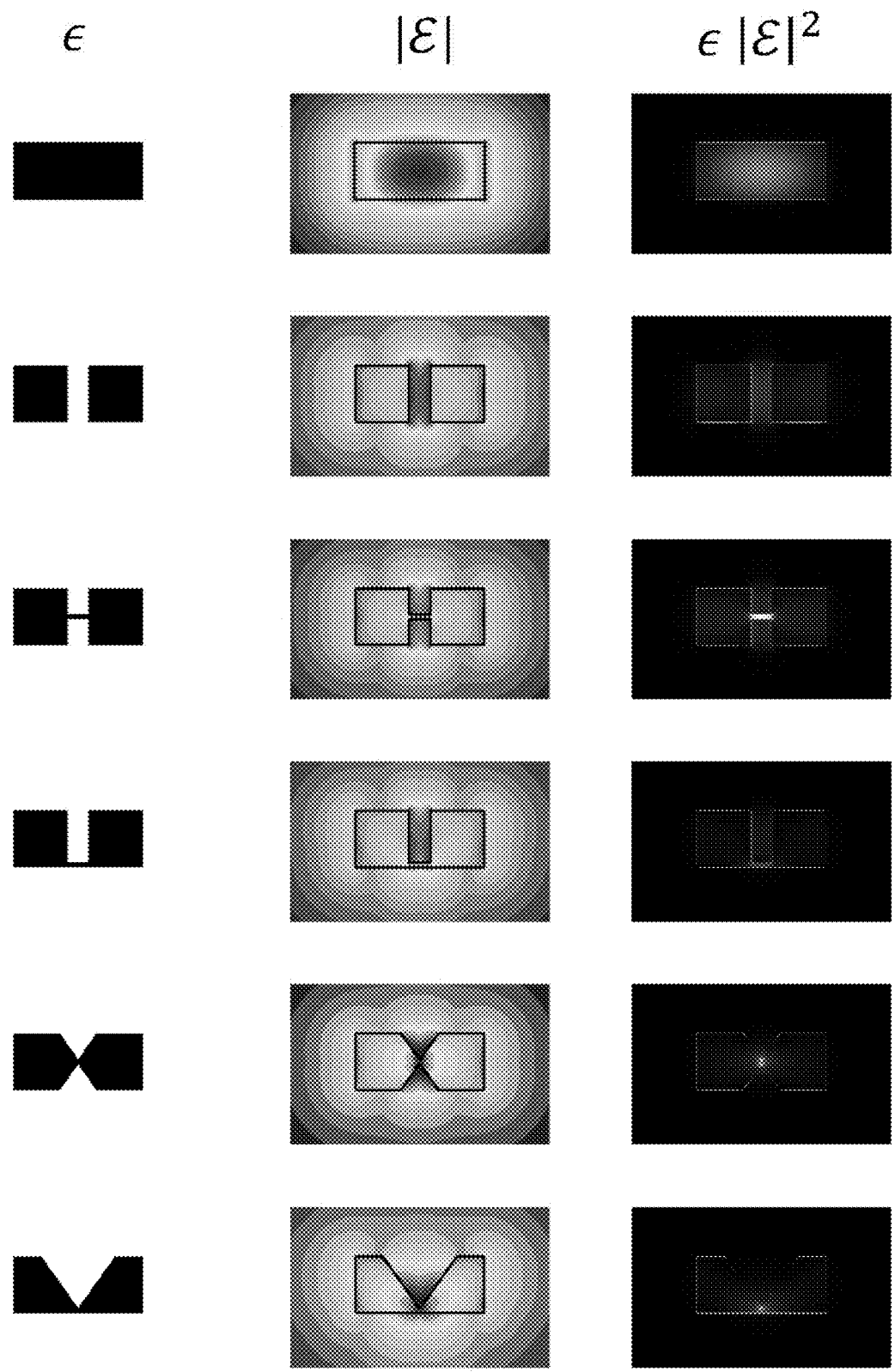
FIG. 3C illustrates potential Type I designs versus prior art strip and slot waveguides shown in row 1 and row 2.

FIG. 3C illustrates potential Type I designs versus prior art strip and slot waveguides shown in row 1 and row 2 of such FIG. 3C.

Designs which improve upon the bridged slot geometry of FIG. 3C (third row) and better approach the $\sim(n_h/n_l)^4$ enhancement factor limit may be achieved by tailoring the structure to enforce boundary Eq. (3) only where the slot effect is maximized, i.e. by using a diabolo or V-Groove geometry as shown in FIG. 3C (row five) and (row six). These diabolo and V-Groove designs function similar to plasmonic bow ties and V-Grooves[28], except they provide the inherent advantages of low-loss all-dielectric media. For prototypical silicon/air and silicon/SiO$_2$ dielectrics considered here, ultra-small waveguide mode areas, $A_n \sim \lambda_0^2/1{,}000$ to $\sim \lambda_0^2/10{,}000$, and high energy densities were observed. The enhanced characteristics are observed to be a particularly strong function of the index contrast and high-index 'bridge' height, h.

The modal properties of different waveguides were studied using a commercially available eigenmode solver (Lumerical MODE). Modal properties are determined by numerical evaluation of the appropriate equation noted in the text. All calculations are performed at $\lambda_0 = 1550$ nm and assume the refractive indices of Si, SiO$_2$, and air to be 3.5, 1.444, and 1.0 respectively. The groove angles are set to 54.7° to mimic the potential shape of a wet etched {100} silicon nanostructure[18]. Numerically determining a converged solution to Maxwell's equations requires adequate mesh resolution and correct physical assessment of the field at corners. A local mesh size of 0.2 nm was employed to enable the accurate evaluation of mode properties for nanoscale values of h. A default non-zero value r=3 nm, unless otherwise specified, was used to avoid non-physical field singularities which would arise at corners with zero radius of curvature r[41]. Ultra-small mode areas were shown to be still readily attainable for comparatively large radii.

Figure 3D:
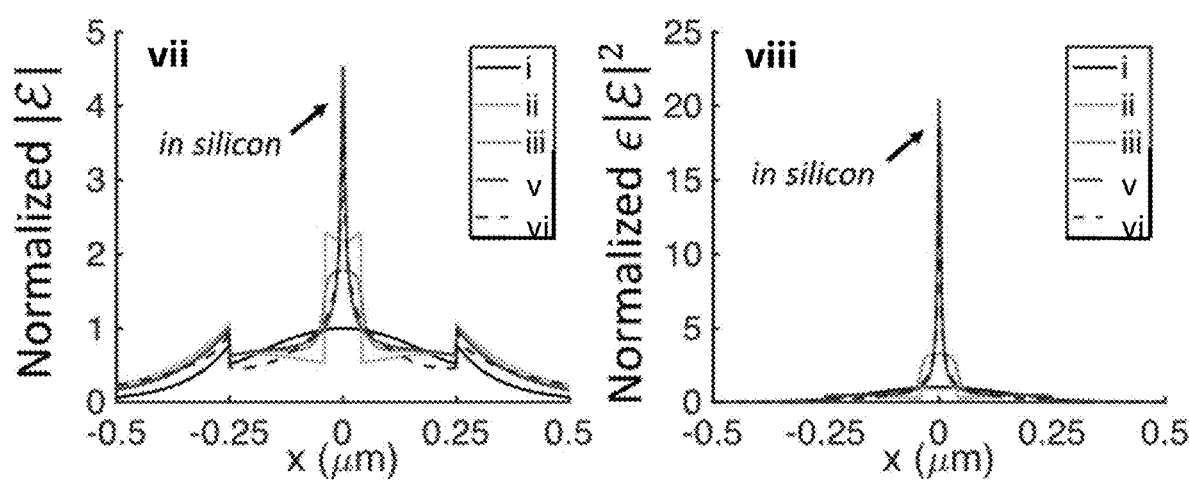
FIG. 3D illustrates graphs of dielectric function, electric field (energy normalized, single color scale), and electric field energy density (peak normalized, individual color scales) for Si/SiO$_2$ waveguide quasi-TE fundamental modes simulated at $\lambda_0$=1.55 µm: (i) strip (500 nm×220 nm), (ii) slot (80 nm), (iii) bridged slot (80 nm, h=20 nm), (v) diabolo (h=5 nm), and (vi) V-Groove (h=5 nm) waveguides, with cross section of (vii) electric field and (viii) electric field energy density illustrated versus x where y is set to the mid-point of the bridge (energy normalized where peak value of (i) is set to unity.

See FIG. 3D, which illustrates graphs of dielectric function, electric field (energy normalized, single color scale), and electric field energy density (peak normalized, individual color scales) for Si/SiO$_2$ waveguide quasi-TE fundamental modes simulated at $\lambda_0 = 1.55$ μm: (i) strip (500 nm×220 nm), (ii) slot (80 nm), (iii) bridged slot (80 nm), (v) diabolo (h=5 nm), and (vi) V-Groove (h=5 nm) waveguides, with cross-section of (vii) electric field and (viii) electric field energy density illustrated versus x where y is set to the mid-point of the bridge (energy normalized where peak value of (i) is set to unity.

As shown in FIGS. 4A through 4C, the V-Groove is realizable via anisotropic wet etching of (100) silicon, which features a self-limiting etch geometry with ultra-low roughness and etch depth variations[18]-[19], while offering a method for realizing sub-5-nm features through conventional photolithography. In particular, FIG. 4A schematically represents anisotropic wet etching of (100) Si as a scalable approach for realizing nanoscale optical confinement, while FIG. 4B schematically represents literature examples of wet etched Si V-Grooves used for growth of InP on (111) Si facets[18], and FIG. 4C schematically represents literature examples of wet etched Si V-Grooves used for fabrication of junction-less MOSFETs with ultra-short ~3 nm channel lengths[19].

The present disclosure investigates the V-Groove geometry as a scalable means for realizing low loss all-dielectric devices featuring nanoscale optical confinement. Key design parameters include the bridge height (h), V-Groove width, and silicon strip dimensions. It is also expected that a single process (all wet etch) bridged-V-Groove waveguide can be realized, by replacing the vertical dry etched sidewalls with wet etched (angled) sidewalls. Practical alternatives to the wet etched bridged-V-Groove can be realized in curvilinear waveguide geometries, for example, by using local oxidation of silicon (LOCOS) or electrochemical nanoimprinting of silicon to realize the desired nanostructure[20]-[21].

Coupling light into the ultra-low mode area waveguides presents a critical challenge for which one can design directional couplers and/or broadband adiabatic directional couplers which can evanescently interface with standard Si nanowire waveguides with minimal loss and return loss[22]-[23]. As an alternative solution for efficient mode conversion, one can consider the possibility of a 3D V-Groove taper fabricated via grayscale EBL and/or grayscale nanoimprint lithography, with which the PI has prior experience[24].

Type II Designs—Deeply Sub-Wavelength all-Dielectric Silicon Waveguides: Longitudinal Scaling:

As illustrated above, Type I proposes to realize extreme transverse scaling of optical energy density by implementing orthogonal boundary conditions in the transverse plane. Type II addresses the question of "how to achieve maximal energy density scaling in 3D?" by extending the presently disclosed subject matter to optical confinement in the longitudinal dimension. This challenge is typically addressed by some form of spatio-temporal compression of light (FIG. 5B), such as forming a resonator to recirculate light or implementing a slow-light PhC. As light is slowed down or confined more tightly into a small region of space, the peak field intensity and energy density necessarily increase, effectively enabling active components to utilize a smaller active volume during operation. However, the propagation constant (or local wave-vector) provides an effective diffraction limit in the longitudinal dimension. While the dispersion characteristics of plasmonic devices allow extreme wave-vectors to become accessible—thereby lowering the diffraction limit in the propagation direction[28]-[29]—such highly dispersive platforms exhibit unacceptably high losses.

As illustrated in FIGS. 5A through 5C, a new pathway has been identified herein for enhancing optical confinement in the longitudinal dimension of a waveguide—"Periodic Spatial Refocusing" (PSR). In particular, FIG. 5A is a conceptual illustration of optical energy density profiles achieved in conventional waveguides (e.g., nanowire or slot), while FIG. 5B is a conceptual illustration of optical energy density profiles achieved in spatiotemporal compression schemes (e.g., slow-light devices or resonators), and FIG. 5C is a conceptual illustration of optical energy density profiles achieved in the presently disclosed technique of periodic spatial refocusing (PSR). The PSR approach is unique in that it achieves extreme light confinement and ultra-high energy densities over an ultra-small but periodically distributed active volume. Moreover, the PSR approach is inherently broadband and low-loss as it does not require resonance or slow-light effects to achieve local field enhancement. This technique emerges from the desire to exploit boundary conditions in the longitudinal direction to further reduce the effective mode area of the presently disclosed waveguides far below the diffraction limit of bulk silicon (Table 2).

In order to benefit from available electric field boundary conditions (i.e., Eq. 2 and Eq. 3), one must break the continuous translational symmetry of the waveguide, which typically has uniform cross-section and a uniform energy density (time-averaged) along the direction of propagation (FIG. 5A). Here, discrete translational symmetry is achieved by introducing a periodic inhomogeneity in the dielectric profile as a function of the z-coordinate. To maintain theoretically lossless waveguiding, one can approach this problem using a sub-wavelength grating waveguide (SGW), which despite its lack of translational symmetry does not scatter light but rather supports lossless propagation in the form of Floquet-Bloch modes[30]-[31]. Onto this SGW, one can superimpose presently disclosed unique sub-wavelength designs which maximize optical confinement. In a prior work, a related concept based on periodic slot waveguides (aka "pinch waveguides") was introduced as a means for locally enhancing the local field intensity relative to conventional slot waveguides[32] and for realizing 1D PhC cavities with ultra-low mode volumes and ultra-high Q/V values[33]-[34].

FIGS. 5D and 5E, respectively, illustrate x position and y position features of two preferred designs (V-Groove and bow tie) relative to current art (slot and strip) using a 1D cross-section.

Figure 6A:
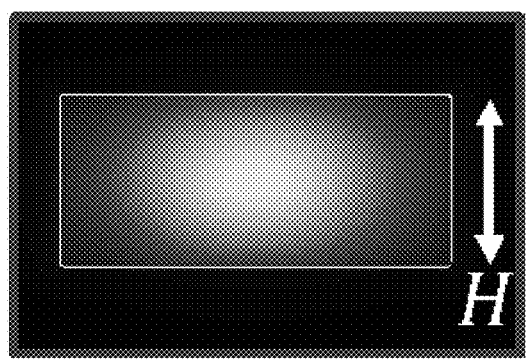
FIGS. 6A and 6B illustrate optical confinement in transverse and longitudinal dimensions, respectively, for a Si nanowire waveguide.
Figure 6C:
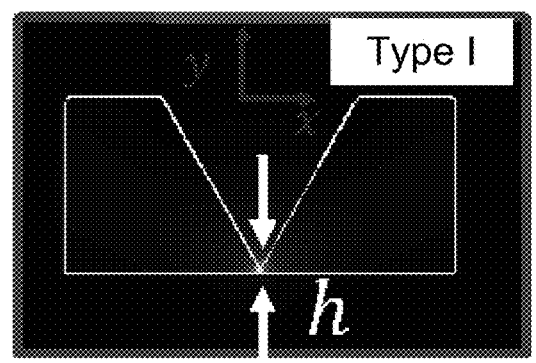
FIGS. 6C and 6D illustrate optical confinement in transverse and longitudinal dimensions, respectively, for presently disclosed deeply sub-wavelength design featuring a bridged V-Groove and diamond unit cell.
Figure 6B:
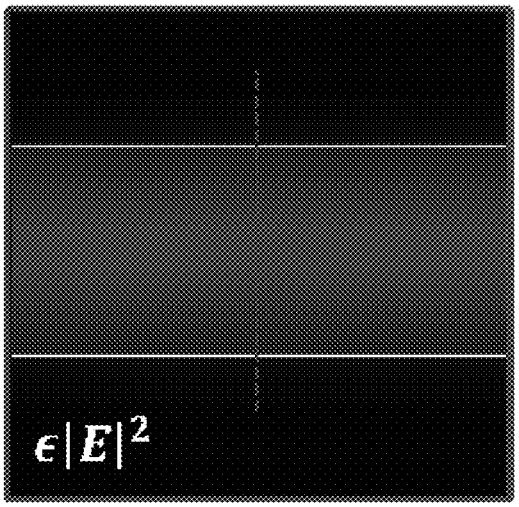
Figure 6D:
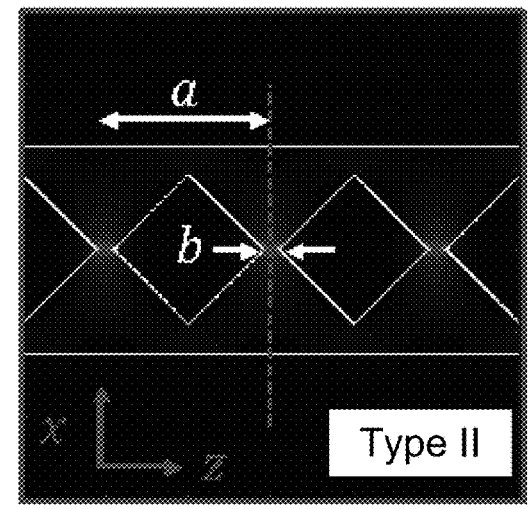

Preliminary simulations demonstrate the efficacy of a diamond unit cell for squeezing light in the longitudinal dimension, in addition to the transverse plane (FIGS. 6A through 6D). In particular, FIGS. 6A and 6B illustrate optical confinement in transverse and longitudinal dimensions for a Si nanowire waveguide, respectively; while FIGS. 6C and 6D illustrate optical confinement in transverse and longitudinal dimensions for presently disclosed deeply sub-wavelength design featuring a bridged V-Groove and diamond unit cell, respectively. This structure is again constrained by the two boundary conditions given in Eq. 2 and Eq. 3, now with the added requirement of satisfying Bloch periodicity. Similar to the V-Groove geometry, the diamond unit cell redistributes the electric field to be at maximum intensity only in the region where both orthogonal boundary conditions are enforced, thus ensuring the maximum field and energy density are focused inside a narrow section of the high-index medium. Notably, this preliminary design (where b/a=0.1) offers an effective mode area ~8-10× reduced compared to the Type I device (Table 2).

The following makes clear two additional points: First, while one can predict the smallest effective mode area for devices which combine the presently disclosed design approach in both the transverse and longitudinal dimensions (full 3D scaling), in practice, high-efficiency active devices may also be realized by applying the presently disclosed design concept in either plane independently (partial 2D scaling). As such, Type II designs may utilize solely longitudinal scaling, or may also include Type I transverse scaling simultaneously. Second, the SGW supports broadband and, theoretically, lossless operation as it does not operate near the photonic crystal band gap and does not rely on band-edge slow light effects but rather operates in the dielectric band.

The Type I and Type II waveguides developed here facilitate the realization of optical and electro-optical devices with improved performance metrics. As an illustrative example, Type I and Type II devices may be utilized in the construction of high-efficiency phase shifters. The physical mechanism of operation can be any practical means of changing the local refractive index (i.e., carrier injection, depletion, thermal, other, etc.). Here, the important aspect of the device is the fact that it achieves a more localized energy density. Therefore, it confines a greater fraction of the energy within a smaller region of transverse area and/or 3D volume. This increased confinement can be retained in a high-index semiconductor such as Si owing to the tandem utilization of orthogonal boundary conditions.

Figure 7A:
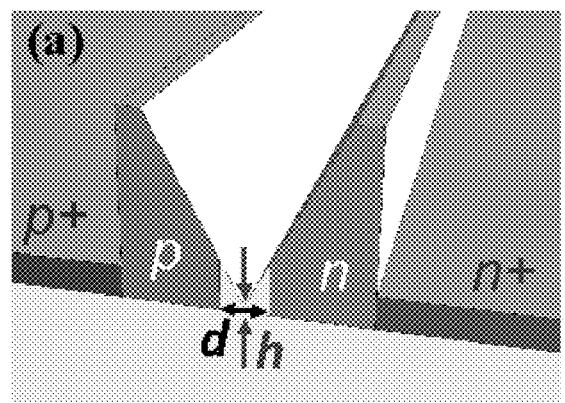
FIG. 7A is a schematic representation of a presently disclosed phase shifter based on a Type I waveguide.
Figure 7B:
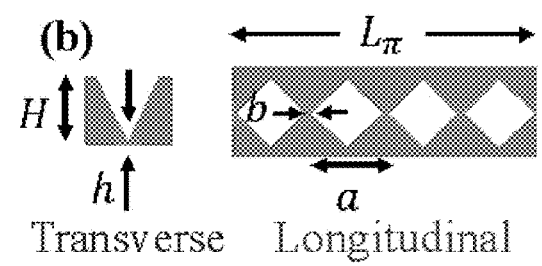
FIG. 7B illustrates a schematic representation summary of an active region in Type I/II waveguides (active region=orange)
Figure 7C:
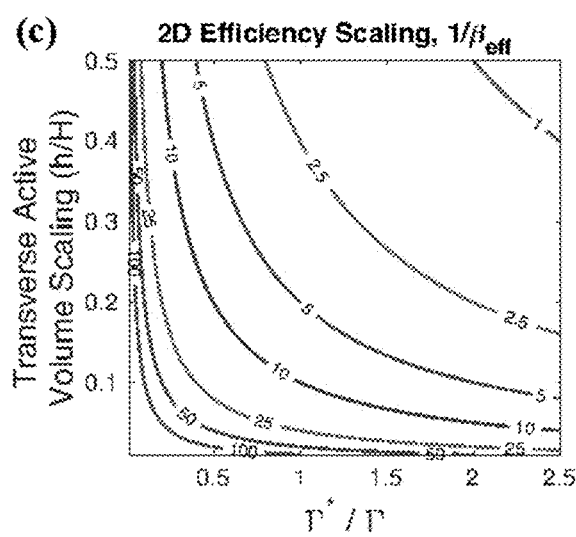
FIGS. 7C and 7D graphically illustrate predicted energy efficiency scaling as a function of active volume scaling and change in confinement factor for presently disclosed 2D and 3D approaches, respectively.
Figure 7D:
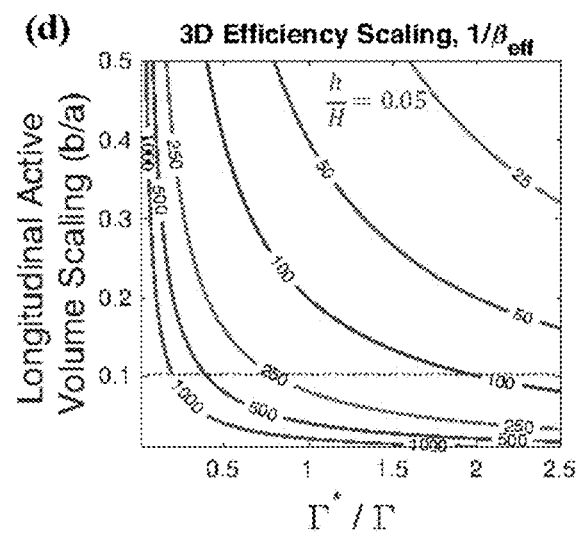

FIGS. 7A and 7B illustrate one potential embodiment of an active electro-optic phase shifter based on Type I and/or Type II designs. In this example, the actively modulated material is assumed to be Silicon. In these devices, the active device volume can be reduced by a significant factor while providing the same phase shift as a standard device. The degree to which this active volume is reduced (under the same phase shift) directly corresponds to a reduction in the power consumption of the device. FIGS. 7C and 7D calculate approximate values for the predicted energy consumption reduction for the illustrative devices in FIGS. 7A and 7B. Here, the realizable scaling factor depends on a number of geometrical and optical confinement factors, such as the size of the active volume relative to a reference device (y-axis in FIGS. 7C and 7D) and the confinement factor in the active volume (or area) of a reference device relative to the Type I or Type II device (x-axis in FIGS. 7C and 7D). These calculations demonstrate that under the appropriate conditions, a 10-1000× reduction in energy consumption may be feasible.

Figure 8:
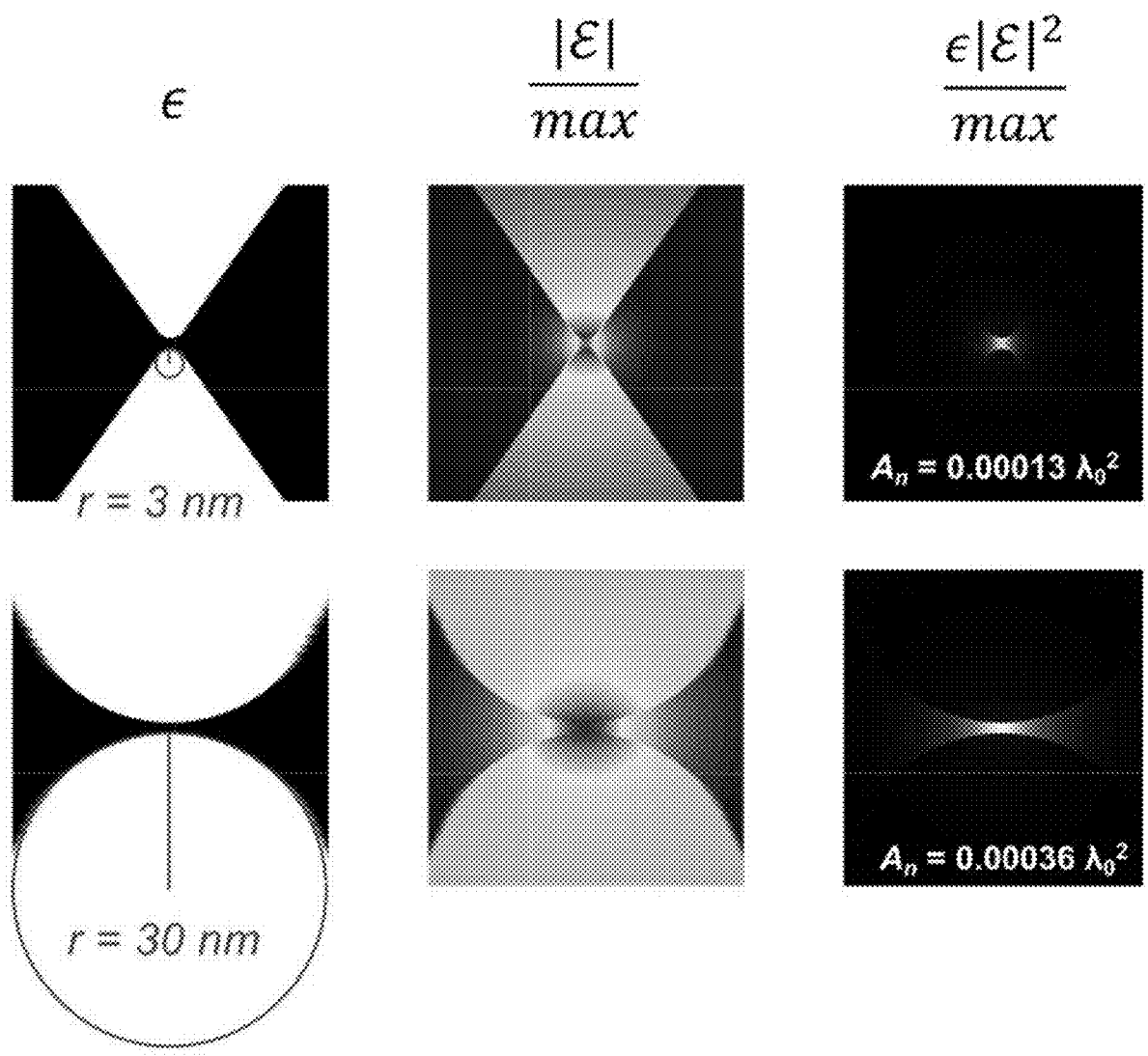
FIG. 8 illustrates an enlarged view of the middle 60×60 nm of an air-clad diabolo waveguide: (left column) dielectric function, (middle column) electric field, and (right column) energy density for groove radii (top row) r=3 nm and (bottom row) r=30 nm, where the silicon bridge height is set to h=2 nm.

As shown in FIG. 8, ultra-small mode dimensions $A_n < \lambda_0^2/2,000$ are observed in the diabolo waveguide even for relatively large radii, e.g. r=30 nm. In both cases considered in FIG. 8, the strong local electric field enhancement is carried into the nanoscale (h=2 nm) silicon bridge. This highlights the robustness of this near field phenomena, which constrains the mode solution by exploiting the vectorial nature of light. More particularly, FIG. 8 illustrates an enlarged view of the middle 60×60 nm of an air-clad diabolo waveguide: (left column) dielectric function, (middle column) electric field, and (right column) energy density for groove radii (top row) r=3 nm and (bottom row) r=30 nm, where the silicon bridge height is set to h=2 nm.

Figures 9A, 9B:
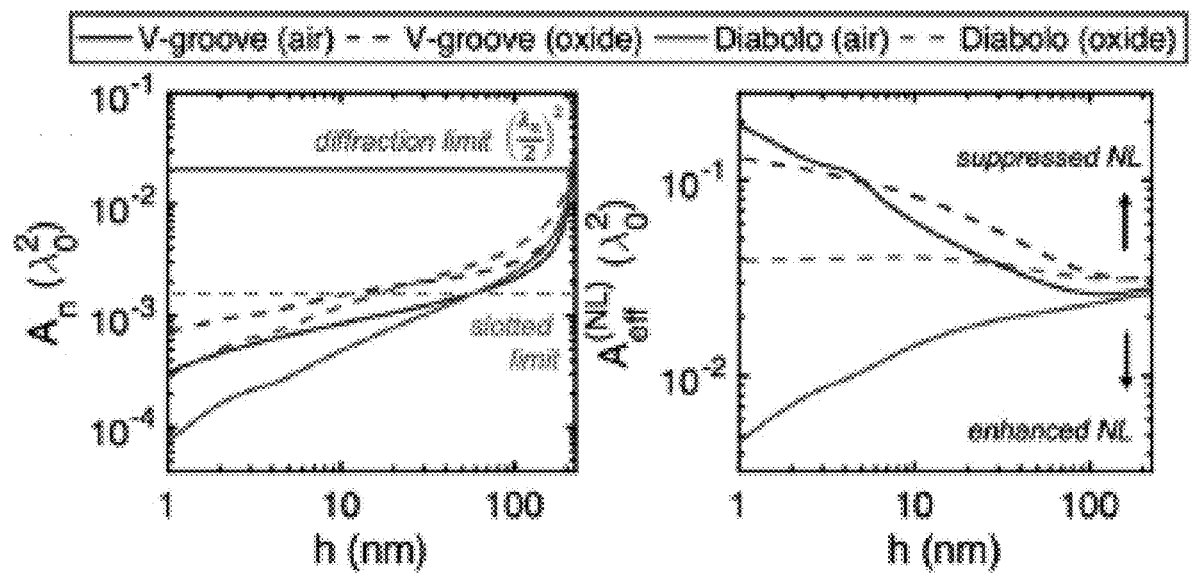
FIGS. 9A-9D respectively illustrate all dielectric V-Groove and diabolo waveguide modal characteristics as a function of bridge height h, with FIG. 9A illustrating 'classic' mode area, FIG. 9B illustrating non-linear effective mode area, FIG. 9C illustrating group and effective indices, and FIG. 9D illustrating transverse core confinement factor (Note that h=220 nm corresponds to an unmodified strip waveguide).
Figures 9C, 9D:
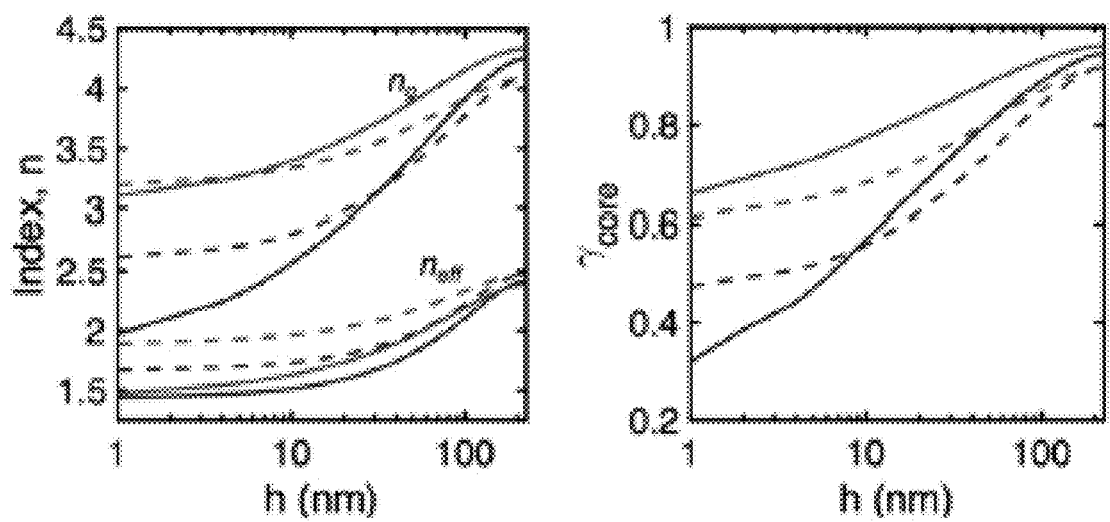

In FIGS. 9A-9D, the modal characteristics of diabolo and V-Groove waveguides as a function of their nanoscaled bridge height h are shown. To examine the effect of index contrast, both oxide and air claddings are considered. In this analysis, the V-Groove bottom cladding is always fixed to oxide whereas a symmetrically distributed cladding material is considered for the diabolo geometry. FIG. 9A reports the classical mode area, $A_n$, which is directly linked to the waveguide Purcell factor and is defined as $$A_n = \frac{\int \epsilon|\varepsilon|^2 dA}{\max(\epsilon|\varepsilon|^2)}. \qquad (4)$$

As shown in FIG. 9A, the mode area $A_n$ of both diabolo and V-Groove waveguides decreases significantly with decreasing h, reaching values in the range $A_n \sim \lambda_0^2/1{,}000$ to $\sim \lambda_0^2/10{,}000$, more than one to two orders of magnitude below the diffraction limit for bulk silicon. The diabolo geometry is observed to enable the smallest values of $A_n$, which is attributed to the centered placement of the bridge and corresponding mode symmetry. Unlike slot waveguides which achieve an electric field energy density enhancement of $\sim(n_h/n_l)^2$ solely in a low index medium, the V-Groove and diabolo waveguides offer $\sim(n_h/n_l)^4$ enhancement in a high-index medium. Also unlike a slot waveguide, the nanoscale bridge dimensions of these structures are expected to be compatible with the critical dimensions of standard photolithography (i.e., >150-300 nm) since the grooves can be realized by anisotropic wet etching of crystalline silicon, while nanoscale tuning of the bridge dimensions can be achieved through varying the process conditions or width of the groove, as reported in V-Groove based junctionless field effect transistors[19].

FIG. 9B illustrates the non-linear (NL) effective mode area $A_{\it eff}^{(NL)}$, which exhibits substantially different characteristics and trends with respect to refractive index contrast and waveguide geometry than the classical mode area $A_n$. While $A_n$ is linked to the peak electric field energy density and the Purcell factor, the separate metric of $A_{\it eff}^{(NL)}$ is linked to the waveguide non-linear coefficient[5]. In both structures evaluated in oxide claddings, reduction of h results in increasing values of $A_{\it eff}^{(NL)}$, indicative of non-linearity suppression. Meanwhile, in the air-clad diabolo waveguide, ultra-small values of $A_{\it eff}^{(NL)}$, smaller than any existing silicon nanowire geometry[42], not employing slow-light effects are predicted[43].

Here, the non-linear effective mode area accounts for the optical Kerr effect, which is assumed to arise strictly from the waveguide core material (e.g., silicon). The non-linear coefficient is maximized when $A_{\it eff}^{(NL)}$ is minimized and vice versa. One common definition often utilized in the literature is $A_{\it eff} = (\int_\infty |\varepsilon|_2 dA)^2/\int_{NL} |\varepsilon|^4 dA$, where 'NL' indicates integration over the non-linear material. However, this expression is only valid in the limit of vanishing index contrast and vanishing contrast between material and waveguide group indices, a regime which is inapplicable to many integrated optical devices and especially those constructed from high-index contrast media. A correct expression for $A_{\it eff}^{(NL)[44,45]}$ crucially requires accounting for the fully-vectorial nature of wave propagation and field confinement in the waveguide, which yields:

$$A_{eff}^{(NL)} = \frac{1}{n_{NL}^2 n_g^2} \frac{\left(\int_\infty \epsilon |\varepsilon|^2 dA\right)^2}{\int_{NL} |\varepsilon|^4 dA} \qquad (5)$$

For the core nonlinearity considered in FIG. 9B, the electric field energy density and $|\varepsilon|^4$ are significantly enhanced in the vicinity of the silicon bridge for small h. However, this local enhancement also coincides with an overall reduction in $n_g$ and $\gamma_{core}$, as observable from FIG. 9C and 9D. In the V-Groove geometry, this results in suppressed non-linearity regardless of the cladding refractive index. Notably, in these devices it is possible to achieve a ~30-50× reduction in $A_n$ (enhancement in Purcell factor), while simultaneously achieving a ~3× suppression in non-linearity from the same medium. This unique capability is unachievable in low-index contrast optics and offers an attractive potential design solution to scaling the efficiency of linear optical devices while suppressing non-linear performance impairments[46].

The high-index contrast of the air clad diabolo waveguide results in a very large peak $|\varepsilon|^4$ enhancement in silicon, which approaches with decreasing h, a theoretical enhancement factor of $\sim(n_h/n_l)^8 \approx 2 \times 10^4$ relative to a homogenous silicon strip waveguide core. Thus, despite its lower transverse confinement factor $\gamma_{core}$ and group index relative to a strip waveguide, the diabolo geometry enables significant reduction in $A_{\it eff}^{(NL)}$. For h≈2 nm, this corresponds to a predicted non-linear silicon waveguide coefficient $\gamma \approx 1.5 \times 10^6$ W$^{-1}$ km$^{-1}$, higher than any silicon waveguide geometry not employing slow-light effects reported to date. This non-linearity enhancement is particularly notable considering the width and height dimensions are unoptimized and the non-linearity could be further enhanced in resonant or slow-light configurations, if desired. These results indicate that the non-linear coefficient of nanophotonic waveguides and related high-index components (e.g., Mie resonant particles), which have been previously optimized for standard geometries (e.g., strip waveguides and disks)[42], are not yet globally optimized when freedom to modify the transverse dielectric structure is also considered. Further, high-index waveguide systems utilizing highly localized non-linearities embedded in high-index media, such as those derived from vacancy centers in diamond[47], would realize the most substantial enhancements to non-linearities.

In summary, a simple approach for designing all-dielectric waveguides capable of achieving unprecedented ultra-small mode areas, amongst any non-plasmonic and metal-free waveguide reported to date, while crucially retaining peak field interaction within high-index solid-state media, is introduced. These results confirm how boundary conditions can be exploited to achieve ultra-small mode dimensions, not solely in photonic crystal cavities[41,48,17], but more ubiquitously, in other high-index contrast nanophotonic structures, e.g. waveguides, under the appropriate field polarization. Hence, it should be expected that these design principles could also be applied to other form factors and devices such as waveguide pillar arrays or dielectric particles. Future investigations on such waveguides and related structures are certainly warranted, and may require the development of advanced nanofabrication techniques, and the assessment and mitigation of potential scattering losses.

The principle physics investigated here rely on boundary conditions to Maxwell's equations. Indeed, the vectorial nature of light offers a powerful tool for tailoring light-matter interactions at the nanoscale, giving rise to form birefringence, surface plasmon, and slot waveguide field and energy density enhancements, metamaterial effects, deep sub-diffraction photonic crystal mode volume reduction, and now all-dielectric waveguide field and energy density enhancements accessible by high-index media. A wide array of scientific and technological applications may benefit from applying these nanophotonic design principles, including, for example, ultra-efficient integrated photonic active devices in both planar (e.g., nanowire) and arrayed (e.g., meta/nano-pillar) formats; high-efficiency sources of classical and quantum light; integrated optical traps; and broadband, slow-light, or resonant non-linear optical devices.

While the present subject matter has been described in detail with respect to specific example embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

REFERENCES

[1] J. Sun, E. Timurdogan, A. Yaacobi, E. S. Hosseini, and M. R. Watts, "Large-scale nanophotonic phased array," *Nature*, vol. 493, no. 7431, pp. 195-199, 2013.

[2] D. N. Hutchison et al., "High-resolution aliasing-free optical beam steering," *Optica*, vol. 3, no. 8, pp. 8-11, 2016.

[3] M. R. Kossey, C. Rizk, and A. C. Foster, "End-fire silicon optical phased array with half-wavelength spacing,"*APL Photonics*, vol. 3, no. 1, p. 11301, 2018.

[4] F. Nogrette et al., "Single-atom trapping in holographic 2D arrays of microtraps with arbitrary geometries," *Phys. Rev. X*, vol. 4, no. 2, pp. 1-9, 2014.

[5] J. Leuthold et al., "Nonlinear silicon photonics," *Nat. Photonics*, vol. 4, no. 8, p. 535, 2010.

[6] D. E. Chang, V. Vuletić, and M. D. Lukin, "Quantum nonlinear optics—Photon by photon," *Nat. Photonics*, vol. 8, no. 9, pp. 685-694, 2014.

[7] N. Singh et al., "Octave-spanning coherent supercontinuum generation in silicon on insulator from 1.06 µm to beyond 2.4 µm," *Light Sci. Appl.*, vol. 7, no. 1, p. 17131, 2018.

[8] D. A. B. Miller, "Attojoule Optoelectronics for Low-Energy Information Processing and Communications," *J. Light. Technol.*, vol. 35, no. 3, pp. 346-396, 2017.

[9] P. Dong et aL, "Low loss shallow-ridge silicon waveguides," *Opt. Express*, vol. 18, no. 14, pp. 14474-14479, 2010.

[10] E. Dulkeith, F. N. Xia, L. Schares, W. M. J. Green, and Y. A. Vlasov, "Group index and group velocity dispersion in silicon-on-insulator photonic wires," *Opt. Express*, vol. 14, no. 9, p. 3853, 2006.

[11] C. Koos, L. Jacome, C. Poulton, J. Leuthold, and W. Freude, "Nonlinear silicon-on-insulator waveguides for all-optical signal processing," *Opt. Express*, vol. 15, no. 10, p. 5976, 2007.

[12] X. Guo, Y. Ma, Y. Wang, and L. Tong, "Nanowire plasmonic waveguides, circuits and devices," *Laser Photonics Rev.*, vol. 7, no. 6, pp. 855-881, 2013.

[13] Y. U. B. Ian and Q. I. R. En, "Deep-sub-wavelength light transmission in hybrid nanowire-loaded silicon nano-rib waveguides," *Photonics Res.*, vol. 6, no. 1, pp. 37-45, 2018.

[14] K. Debnath et al., "Low-Loss Silicon Waveguides and Grating Couplers Fabricated Using Anisotropic Wet Etching Technique," *Front. Mater.*, vol. 3, no. February, pp. 1-7, 2016.

[15] J. T. Robinson, K. Preston, O. Painter, and M. Lipson, "First-principle derivation of gain in high-index-contrast waveguides," *Opt. Express*, vol. 16, no. 21, pp. 16659-16669, 2008.

[16] V. R. Almeida, Q. F. Xu, C. A. Barrios, and M. Lipson, "Guiding and confining light in void nanostructure," *Opt. Lett.*, vol. 29, no. 11, p. 1209, 2004.

[17] H. Choi, M. Heuck, and D. Englund, "Self-Similar Nanocavity Design with Ultrasmall Mode Volume for Single-Photon Nonlinearities,"*Phys. Rev. Lett.*, vol. 118, no. 22, pp. 1-6, 2017.

[18] Z. Wang et al., "Room-temperature InP distributed feedback laser array directly grown on silicon," *Nat. Photonics*, vol. 9, no. 12, pp. 837-842, 2015.

[19] S. Migita, Y. Morita, M. Masahara, and H. Ota, "Fabrication and demonstration of 3-nm-channel-length junctionless field-effect transistors on silicon-on-insulator substrates using anisotropic wet etching and lateral diffusion of dopants,"*Jpn. J. Appl. Phys.*, vol. 52, no. 4 PART 2, pp. 3-8, 2013.

[20] G. Beaudin, A. Belarouci, and V. Aimez, "Precise localized thinning and vertical taper fabrication for silicon photonics using a modified local oxidation of silicon (LOCOS) fabrication process," *Opt. Express*, vol. 23, no. 4, p. 4377, 2015.

[21] A. Sharstniou, S. Niauzorau, and B. Azredo, "Electrochemical nanoimprinting of silicon: A direct patterning approach," *Proc. SPIE* 10584, Nov. *Patterning Technol.*, vol. 105840Y, no. March, 2018.

[22] W. D. Sacher, T. Barwicz, B. J. F. Taylor, and J. K. S. Poon, "Polarization rotator-splitters in standard active silicon photonics platforms," *Opt. Express*, vol. 22, no. 4, p. 3777, 2014.

[23] N. N. Feng, R. Sun, L. C. Kimerling, and J. Michel, "Lossless strip-to-slot waveguide transformer," *Opt. Lett.*, vol. 32, no. 10, pp. 1250-1252, 2007.

[24] J. D. Ryckman, Y. Jiao, and S. M. Weiss, "Three-dimensional patterning and morphological control of porous nanomaterials by gray-scale direct imprinting," *Sci. Rep.*, vol. 3, 2013.

[25] M. Krishnamurthi et al., "Optical Coupler," U.S. Pat. No. 9,709,734, 2016.

[26] J. D. Ryckman, "Double-sided orthogonal grating optical coupler," U.S. Pat. No. 9,715,066, 2017.

[27] J. D. Ryckman et al., "Single mode optical coupler," U.S. patent application Ser. No. 15/282,728, 2016.

[28] D. K. Gramotnev and S. I. Bozhevolnyi, "Plasmonics beyond the diffraction limit," *Nat. Photonics*, vol. 4, no. 2, p. 83, 2010.

[29] S. A. Maier and H. A. Atwater, "Plasmonics: Localization and guiding of electromagnetic energy in metal/dielectric structures," *J Appl. Phys.*, vol. 98, no. 1, pp. 1-10, 2005.

[30] R. Halir et al., "Waveguide sub-wavelength structures: A review of principles and applications," *Laser Photonics Rev.*, vol. 9, no. 1, pp. 25-49, 2015.

[31] S. G. Johnson, A. Mekis, S. H. Fan, and J. D. Joannopoulos, "Molding the flow of light," *Comput. Sci. Eng.*, vol. 3, no. 6, p. 38, 2001.

[32] J. D. Ryckman and S. M. Weiss, "Localized field enhancements in guided and defect modes of a periodic slot waveguide," *IEEE Photonics J.*, vol. 3, no. 6, 2011.

[33] J. D. Ryckman and S. M. Weiss, "Low mode volume slotted photonic crystal single nanobeam cavity," *Appl. Phys. Lett.*, vol. 71104, no. 7, pp. 19-23, 2012.

[34] J. D. Ryckman, "Porous and Phase Change Nanomaterials for Photonic Applications," Vanderbilt University, 2013.

[35] E. Timurdogan, C. M. Sorace-Agaskar, J. Sun, E. Shah Hosseini, A. Biberman, and M. R. Watts, "An ultralow power athermal silicon modulator," *Nat. Commun.*, vol. 5, pp. 1-11, 2014.

[36] N. C. Harris et al., "Efficient, Compact and Low Loss Thermo-Optic Phase Shifter in Silicon," *Opt. Express*, vol. 22, no. 9, pp. 83-85, 2014.

[37] H. S. Rong et al., "A continuous-wave Raman silicon laser," *Nature*, vol. 433, no. 7027, p. 725, 2005.

[38] E. Dulkeith, Y. a Vlasov, X. Chen, N. C. Panoiu, and R. M. Osgood, Jr., "Self-phase-modulation in submicron silicon-on-insulator photonic wires," *Opt. Express*, vol. 14, no. 12, pp. 5524-5534, 2006.

[39] J. D. Ryckman, K. A. Hallman, R. E. Marvel, R. F. Haglund Jr., and S. M. Weiss, "Ultra-compact silicon photonic devices reconfiguredby an optically induced semiconductor-to-metal transition," *Opt. Express*, vol. 21, no. 9, pp. 10753-10763, 2013.

[40] J. D. Ryckman et al., "Photothermal optical modulation of ultracompact hybrid Si-V02 ring resonators," *Opt. Express*, vol. 20, no. 12, pp. 13215-13225, 2012.

[41] S. Hu, S. M. Weiss, Design of Photonic Crystal Cavities for Extreme Light Concentration. ACS Photonics. 3, 1647-1653 (2016).

[42] M. A. Foster, K. D. Moll, A. L. Gaeta, Optimal waveguide dimensions for nonlinear interactions. Opt. Express. 12, 2880 (2004).

[43] C. Monat, B. Corcoran, M. Ebnali-Heidari, C. Grillet, B. J. Eggleton, T. P. White, L. O'Faolain, T. F. Krauss, Slow light enhancement of nonlinear effects in silicon engineered photonic crystal waveguides. *Opt. Express*. 17, 2944-2953 (2009).

[44] K. Guo, S. M. M. Friis, J. B. Christensen, E. N. Christensen, X. Shi, Y. Ding, H. Ou, K. Rottwitt, Full-vectorial propagation model and modified effective mode area of four-wave mixing in straight waveguides. *Opt. Lett.* 42, 3670 (2017).

[45] J. Lægsgaard, N. A. Mortensen, A. Bjarklev, Mode areas and field-energy distribution in honeycomb photonic bandgap fibers. J. Opt. Soc. Am. B. 20, 2037-2045 (2003).

[46] M. de Cea, A. H. Atabaki, R. J. Ram, Power handling of silicon microring modulators. Opt. Express. 27, 24274 (2019).

[47] M. K. Bhaskar, D. D. Sukachev, A. Sipahigil, R. E. Evans, M. J. Burek, C. T. Nguyen, L. J. Rogers, P. Siyushev, M. H. Metsch, H. Park, F. Jelezko, M. Lončar, M. D. Lukin, Quantum Nonlinear Optics with a Germanium-Vacancy Color Center in a Nanoscale Diamond Waveguide. Phys. Rev. Lett. 118, 223603 (2017).

[48] S. Hu, M. Khater, R. Salas-montiel, E. Kratschmer, S. Engelmann, W. M. J. Green, S. M. Weiss, Experimental realization of deep-sub-wavelength confinement in dielectric optical resonators. Sci. Adv. 4 (2018).

What is claimed is:

1. A subwavelength all-dielectric waveguide, comprising a body of a plurality of metal-free all-dielectric nanostructure geometries which respectively confine light into ultra-small waveguide mode areas with $A_n$ in a range from about $\lambda_0^2/1,000$ to about $\lambda_0^2/10,000$, wherein said nanostructure geometries comprise scalable dielectric silicon photonic nanostructures having discrete translational symmetry achieved by included periodic inhomogeneity in the dielectric profile as a function of the z-coordinate, for creating Periodic Spatial Refocusing (PSR) for enhancing optical confinement in the longitudinal dimension of said waveguide.

2. A waveguide as in claim 1, wherein said waveguide comprises a sub-wavelength grating waveguide (SGW).

3. A waveguide as in claim 2, further comprising a taper for low-loss mode conversion into the nanostructured SGW.

4. A waveguide as in claim 3, wherein said taper comprises a phase-matched evanescent directional coupler.

5. A waveguide as in claim 3, wherein said taper comprises apodized SGW taper.

6. A method for fabricating waveguide geometry that enables deep subwavelength field confinement to be achieved in all-dielectric structures, without the requirement for plasmonic nanostructures, comprising:
realizing a waveguide design in an all-dielectric silicon waveguide based on preferential wet etching in the [100] direction, wherein said waveguide design results in a predetermined shaped waveguide,
wherein said waveguide comprises a bridged waveguide design having a nanoscale height silicon bridge with a height less than 50 nm.

7. A method as in claim 6, wherein said waveguide design comprises a bridged-bowtie waveguide design or a bridged-V-groove waveguide design comprising a strip waveguide with a V-groove etched into the middle thereof, terminating before reaching the bottom of the strip waveguide.

8. A method as in claim 7, further comprising using said waveguide in an opto-electronic system having one of a transceiver for data center communications, a phased array for laser ranging and 3D sensing, and an active metamaterial.

9. A method as in claim 8, wherein said waveguide is combined in an opto-electronic system having a plurality of arrays of active photonic components on a single chip for one of wavefront shaping LIDAR or active metamaterials.

10. A method as in claim 7, wherein said bridged-V-groove waveguide has predetermined V-groove tip radius of curvature and groove/bridge height and width variation, selected for optimized waveguide performance of effective mode area, $A_{eff}$, and the transverse confinement factor $\Gamma$.

11. A method as in claim 7, further comprising periodically applying orthogonal boundary conditions to said waveguide design, operating as a subwavelength grating.

12. A method as in claim 6, wherein said waveguide design further comprises nanostructure geometries which comprise scalable silicon photonic nanostructures for improved light confinement in inhomogenous all-dielectric systems.

13. A method as in claim 12, further comprising using said waveguide design as an active optoelectronic device in a photonic circuit or system, for providing nonlinear optics and all-optical signal processing in silicon.

14. A method as in claim 6, wherein said waveguide design comprises a Si nanowire waveguide providing optical confinement in transverse and longitudinal dimensions, respectively.

15. A method as in claim 6, wherein said waveguide design comprises a bridged V-groove waveguide and a diamond unit cell for squeezing light in the longitudinal dimension in addition to the transverse plane.

16. A method as in claim 6, wherein said waveguide design is configured for comprising a partial 2D scaling waveguide providing optical confinement in either the transverse or longitudinal plane independently.

17. A method as in claim 6, wherein said waveguide design is configured for comprising a full 3D scaling waveguide providing optical confinement in transverse and longitudinal dimensions, respectively.

18. A method as in claim 6, wherein said waveguide design comprises one of an ultra-efficient phase shifter and a nonlinear silicon waveguide.

19. A method as in claim 6, wherein said waveguide design comprises an ultra-efficient phase shifter comprising an electrooptic device based on reverse biased pn diodes or a thermo-optic device based on Joule heating.

20. A method as in claim 6, wherein said waveguide design comprises an ultra-efficient phase shifter comprising an electrooptic device based on reverse biased pin diodes.

21. A method as in claim 6, wherein said waveguide design comprises an ultra-efficient phase shifter comprising a thermo-optic phase-shifter with a p-type waveguide doping contacted on both sides by p++ regions to form a resistive element, with thermo-optic effect induced by Joule heating.

22. A method as in claim 6, wherein said waveguide design comprises an ultra-efficient phase shifter comprising an electrooptic device or a thermo-optic device, based on tape-out layers comprising alignment, V-groove, Si waveguide, p+, n+, p, n, via, or metal.

23. A method as in claim 12, wherein said nanostructure geometries comprise scalable dielectric silicon photonic nanostructures having discrete translational symmetry achieved by included periodic inhomogeneity in the dielectric profile as a function of the z-coordinate, for creating Periodic Spatial Refocusing (PSR) for enhancing optical confinement in the longitudinal dimension of said waveguide.

24. A method as in claim 23, wherein said waveguide comprises a sub-wavelength grating waveguide (SGW).

25. A method as in claim 24, further comprising a taper for low-loss mode conversion into the nanostructured SGW.

26. A method as in claim 25, wherein said taper comprises a phase-matched evanescent directional coupler.

27. A method as in claim 25, wherein said taper comprises apodized SGW taper.

28. A method as in claim 6, wherein said waveguide design comprises Potassium Hydroxide (KOH) etched silicon with resulting V-Groove structure formed with angles less than 55 degrees with its surface.

29. A method as in claim 6, wherein said waveguide design comprises curvilinear waveguide geometries, formed by one of local oxidation of silicon (LOCOS) or electrochemical nanoimprinting of silicon.

* * * * *